United States Patent
Ramsey

(10) Patent No.: US 7,153,892 B2
(45) Date of Patent: Dec. 26, 2006

(54) ENVIRONMENTALLY FRIENDLY, ACTINIC RADIATION CURABLE COATING COMPOSITIONS FOR COATING THERMOPLASTIC OLEFIN OBJECTS AND METHODS, PROCESSES AND ASSEMBLAGES FOR COATING THEREOF

(75) Inventor: Sally W. Ramsey, Tallmadge, OH (US)

(73) Assignee: Ecology Coating, Inc., Akron, OH (US)

( * ) Notice: Subject to any disclaimer, the term of this patent is extended or adjusted under 35 U.S.C. 154(b) by 0 days.

(21) Appl. No.: 11/128,876

(22) Filed: May 12, 2005

(65) Prior Publication Data

US 2006/0258765 A1 Nov. 16, 2006

(51) Int. Cl.
C09D 4/02 (2006.01)
C08K 3/14 (2006.01)
C08K 3/22 (2006.01)
C08K 3/28 (2006.01)

(52) U.S. Cl. .............................. 522/8; 522/42; 522/44; 522/46; 522/64; 522/71; 522/81; 522/83; 428/575

(58) Field of Classification Search .................. 522/83, 522/182, 8, 64, 44, 46, 71, 81
See application file for complete search history.

(56) References Cited

U.S. PATENT DOCUMENTS

| | | | |
|---|---|---|---|
| 5,300,326 A * | 4/1994 | Zezinka et al. ........... | 427/385.5 |
| 5,425,970 A * | 6/1995 | Lahrmann et al. ........... | 427/493 |
| 6,203,913 B1 * | 3/2001 | Kondos et al. ........... | 428/423.1 |
| 6,399,670 B1 * | 6/2002 | MacQueen et al. ........... | 522/64 |
| 6,426,034 B1 * | 7/2002 | McComas et al. .......... | 264/494 |
| 6,777,706 B1 * | 8/2004 | Tessler et al. ................. | 257/17 |
| 6,844,374 B1 * | 1/2005 | Jin et al. ...................... | 522/79 |
| 2002/0137872 A1 * | 9/2002 | Schneider et al. ............. | 528/44 |
| 2003/0036604 A1 * | 2/2003 | Meisenburg et al. ......... | 525/123 |

OTHER PUBLICATIONS

Koleske, Joseph V., "*Mechanical Properties of Solid Coatings*" *Encyclopedia of Analytical Chemistry*, John Wiley & Sons, 2000.
Sartomer Application Bulletin, "*Adhesion of Radiation Cured Coatings to Plastics*", available from Sartomer, Exton, PA.
Sartomer Application Bulletin, "*Achieving Adhesion Using a Low Skin and Eye Irriation Tetrahydrofurfuryl Acrylate Based Monomer*", available from Sartomer, Exton, PA.
Sartomer Application Bulletin, "*Adhesion promoters for UV/EB Cure Applications*", available from Sartomer, Exton, PA.
Williams, Kevin A., "*Nuts & Bolts: Getting the most out of chlorinated polyolefin (CPO) adhesion promoters*", Paint & Coating Industry, at www.pcimag.com, Posted Nov. 11, 2004.
Lawniczak, Jon, and Callahan, Mike, "*Market and Technical Aspects for Obtaining Paint Adhesions to Plastic Parts*", *International Coatings for Plastic Symposium*, May 20-22, 2002, Troy MI.
Technical Support Document, "*National Emission Standards for Hazardous Air Pollutants: Surface Coating of Plastic Parts and Products*", United State Environmental Protection Agency, Sep. 2002.

* cited by examiner

*Primary Examiner*—Susan Berman
(74) *Attorney, Agent, or Firm*—Wilson Sonsini Goodrich & Rosati

(57) ABSTRACT

Disclosed are environmentally friendly coating compositions for coating thermoplastic olefin objects and which are curable using ultraviolet and visible radiation. Even if the coating compositions are applied to an unprimed surface, the resulting cured compositions have excellent adhesion. The cured coatings have improved adhesion properties and clear coat embodiments have improved clarity properties. In addition, methods are disclosed for coating surfaces, or at least a portion of the surfaces, and curing of the coated surface to obtain partially or fully cured coated surfaces are also disclosed. Furthermore, articles of manufacture incorporating fully cured coated surfaces are disclosed, including, for example motor-vehicle bumpers. Also disclosed are methods, processes, production lines, articles of manufacture, and factories which incorporate these environmentally friendly coating compositions.

16 Claims, 5 Drawing Sheets

ENVIRONMENTALLY FRIENDLY, ACTINIC RADIATION CURABLE COATING COMPOSITIONS FOR COATING THERMOPLASTIC OLEFIN OBJECTS AND METHODS, PROCESSES AND ASSEMBLAGES FOR COATING THEREOF

BACKGROUND OF THE INVENTION

Thermoplastic olefin may be used in the fabrication of a variety of consumer, scientific, and industrial products. Coating the surfaces of such thermoplastic olefin objects requires pretreatment, or priming, of the surfaces to ensure adhesion of the resulting coating. In general, the surfaces of thermoplastic objects are primed using adhesion promoters such as volatile organic solvents. Health, safety and environmental problems may result from the evaporation of these volatile solvents.

SUMMARY OF THE INVENTION

Presented herein are environmentally friendly actinic radiation curable coating compositions and methods for coating thermoplastic olefin objects, surfaces of thermoplastic olefin objects, and objects which comprise thermoplastic olefin, all of which may or may not have angular features. Such coating compositions produce less volatile materials, produce less waste and require less energy than non-actinic radiation curable coating compositions. Furthermore, such coating compositions may be used to produce coatings having desirable aesthetic, performance and durability properties. Further presented are partially and fully cured surfaces, along with articles of manufacture incorporating fully cured surfaces.

In one aspect the actinic radiation curable compositions described herein may be applied to an unprimed thermoplastic olefin object, the surface of an unprimed thermoplastic olefin object, and/or an object that comprises an unprimed thermoplastic olefin surface or object.

In one aspect the actinic radiation curable compositions described herein are comprised of a mixture of at least one monomer, at least one photoinitiator, optionally at least one oligomer, optionally at least one nano-filler, optionally at least one polymerizable pigment dispersion, and optionally at least one surfactant, wherein the composition when cured as a coating on a thermoplastic olefin material (which may be optionally unprimed) is an abrasion and scratch resistant coating having at least one property selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°.

In an embodiment of the this aspect, the composition when cured as a coating on a thermoplastic olefin material (which may be optionally unprimed) is an abrasion and scratch resistant coating having at least two properties selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In further or alternative embodiments, the composition when cured as a coating on a thermoplastic olefin material (which may be optionally unprimed) is an abrasion and scratch resistant coating having at least three properties selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In further or alternative embodiments, the composition when cured as a coating on a thermoplastic olefin material (which may be optionally unprimed) is an abrasion and scratch resistant coating having (a) at least 4H hardness; (b) no yellowing after 7 weeks of accelerated LTV radiation testing; (c) 99+% adhesion; and (d) total light transmittance of 80 to 100% at scattering angles of 0.1 to 10°.

In an embodiment of the aforementioned aspect, the actinic radiation curable composition comprises at least one monomer or a multiplicity of monomers present in the mixture between about 75–98% by weight. In a further or alternative embodiments, the actinic radiation curable, composition comprises at least one photoinitiator or a multiplicity of photoinitiators present in the mixture between about 2–10% by weight. In further or alternative embodiments, the actinic radiation curable composition optionally comprises up to about 10% by weight of at least one oligomer or a multiplicity of oligomers. In still further or alternate embodiments, the actinic radiation curable composition optionally comprises up to about 17% by weight of at least one nano-filler or a multiplicity of nano-fillers. In further or alternative embodiments, the actinic radiation curable composition optionally comprises up to about 2% by weight of at least one surfactant or a multiplicity of surfactants present in the mixture. In further or alternative embodiments, the actinic radiation curable composition optionally comprises up to about 15% by weight of a polymerizable pigment dispersion or a multiplicity of polymerizable pigment dispersions. In still further or alternative embodiments, the actinic radiation curable composition mixture comprises 75–98% percent by weight of a monomer or a multiplicity of monomers, and 2–10% by weight of a photoinitiator or a multiplicity of photoinitiators. In further or alternative embodiments of this aspect, the actinic radiation curable composition comprises 75–98% percent by weight of an monomer or a multiplicity of monomers, 2–10% by weight of a photoinitiator or a multiplicity of photoinitiators, and up to about 10% by weight of an oligomer or a multiplicity of oligomers. In still further or alternative embodiments, the actinic radiation curable composition comprises 75–98% percent by weight of an monomer or a multiplicity of monomers, 2–10% by weight of a photoinitiator or a multiplicity of photoinitiators, up to about 10% by weight of an oligomer or a multiplicity of oligomers, and up to about 17% by weight of a nano-filler or a multiplicity of nano-fillers. In further or alternative embodiments, the actinic radiation curable composition comprises 75–98% percent by weight of an monomer or a multiplicity of monomers, 2–10% by weight of a photoinitiator or a multiplicity of photoinitiators, up to about 10% by weight of an oligomer or a multiplicity of oligomers, up to about 17% by weight of a nano-filler or a multiplicity of nano-fillers, and up to about 15% by weight of a polymerizable pigment dispersion or a multiplicity of polymerizable pigment dispersions. In further or alternative embodiments, the actinic radiation curable composition comprises 75–98% percent by weight of an monomer or a multiplicity of monomers, 2–10% by weight of a photoinitiator or a multiplicity of photoinitiators, up to about 10% by weight of an oligomer or a multiplicity of oligomers, up to about 17% by weight of a nano-filler or a multiplicity of nano-fillers, up to about 15% by weight of a polymerizable pigment dispersion or a multiplicity of polymerizable pigment dispersions, and up to about 2% by weight of a surfactant or a multiplicity of surfactants; whereby the room temperature viscosity of the composition is about 30 centipoise.

In further or alternative embodiments of this aspect, the monomers may be selected from a group consisting of tetrahydrofurfuryl acrylates, isobornyl acrylates, 1,4-butanediol dimethylacrylate, 2-phenoxyethyl acrylate, propoxylated glyceryl triacrylates, trimethylolpropane triacrylate, acrylate ester derivatives, methacrylate ester derivatives, tripropylene glycol diacrylate, and combinations thereof. In further or alternative embodiments, at least one monomer swells the thermoplastic olefin material (which may be optionally unprimed) thereby improving adhesion of the cured coating.

In further or alternative embodiments, the oligomers may be selected from a group consisting of urethane acrylates, aliphatic urethane acrylates, aliphatic urethane triacrylate/monomer blends, aliphatic urethane triacrylates blended with 1,6-hexanediol acrylate, hexafunctional urethane acrylates, siliconized urethane acrylates, aliphatic siliconized urethane acrylates, CN990, epoxy acrylates, epoxy diacrylate/monomer blends, silicone acrylate, fatty acid modified bisphenol A acrylates, bisphenol epoxy acrylates blended with trimethylolpropane triacrylate, and combinations thereof.

In still further or alternative embodiments, the photoinitiators may be selected from a group consisting of IRGACURE® 500, ESACURE® KTO-46, ESACURE® KTO, DARACUR® 1173, Lucirin®TPO, diphenyl (2,4,6-trimethylbenzoyl) phosphine oxide, dimethyl ketal, benzophenone, 1-hydroxycyclohexyl phenyl ketone, 2-hydroxy-2-methyl-1-phenyl-propan-1-one, 2,4,6,-trimethylbenzophenone, 4-methylbenzophenone, oligo (2-hydroxy-2-methyl-1-(4-(1-methylvinyl)phenyl) propanone), and combinations thereof.

In another or alternative embodiments, the actinic radiation curable composition further comprises up to about 2% of a co-photoinitiator selected from amine acrylates, thioxanthone, dimethyl ketal, benzyl methyl ketal, and combinations thereof.

In a still further or alternative embodiment, the fillers are selected from a group consisting of amorphous silicon dioxide prepared with polyethylene wax, synthetic amorphous silica with organic surface treatment, IRGANOX®, untreated amorphous silicon dioxide, alkyl quaternary bentonite, colloidal silica, acrylated colloidal silica, alumina, zirconia, zinc oxide, niobia, titania aluminum nitride, silver oxide, cerium oxides, and combinations thereof. Further, the average size of the filler particles is less than 10 micrometers, or less than 5 micrometers, or even less than 1 micrometer.

In further or alternative embodiments, the nano-fillers may be selected from a group consisting of nano-aluminum oxide, nano-silicon dioxide, nano-zirconium oxide, nano-zirconium dioxides, nano-silicon carbide, nano-silicon nitride, nano-sialon, nano-aluminum nitride, nano-bismuth oxide, nano-cerium oxide, nano-copper oxide, nano-iron oxide, nano-nickel titanate, nano-niobium oxide, nano-rare earth oxide, nano-silver oxide, nano-tin oxide, and nano-titanium oxide, and combinations thereof. In addition, the average size of the nano-filler particles is less than 100 nanometers.

In further or alternative embodiments, the polymerizable pigment dispersions are comprised of at least one pigment attached to an activated resin; wherein the activated resin is selected from a group consisting of acrylate resins, methacrylate resins, and vinyl resins, and the pigment is selected from a group consisting of carbon black, rutile titanium dioxide, organic red pigment, phthalo blue pigment, red oxide pigment, isoindoline yellow pigment, phthalo green pigment, quinacridone violet, carbazole violet, masstone black, light lemon yellow oxide, light organic yellow, transparent yellow oxide, diarylide orange, quinacridone red, organic scarlet, light organic red, and deep organic red.

In further or alternative embodiments, the actinic radiation curable composition is suitable as a coating on thermoplastic olefin objects (which may be optionally unprimed). In further or alternative embodiments, the coating may be applied to the surface of thermoplastic olefin objects (which may be optionally unprimed) by means of spraying, brushing, rolling, dipping, blade coating, curtain coating or a combination thereof. Further, the means of spraying includes, but is not limited to, the use of a High Volume Low Pressure (HVLP) spraying systems, air-assisted/airless spraying systems, or electrostatic spraying systems. In further or alternative embodiments, the coating is applied in a single application, or in multiple applications. In further or alternative embodiments, the surfaces of thermoplastic olefin objects (which may be optionally unprimed) are partially covered by the coating, or in still further or alternative embodiments, the surfaces of thermoplastic olefin objects (which may be optionally unprimed) are fully covered by the coating. In any of these embodiments, at least one monomer in the curable composition swells the thermoplastic olefin material (which may be optionally unprimed) thereby improving adhesion of the cured coating.

In further or alternative embodiments, the surfaces of thermoplastic olefin (which may be optionally unprimed) objects become partially covered, or become fully covered by the uncured coating. In further or alternative embodiments are thermoplastic olefin (which may be optionally unprimed) objects with an uncured coated surface, wherein the thermoplastic olefin objects (which may be optionally unprimed) can include non-thermoplastic olefin portions/features/objects such as, but not limited to, metal objects, fiber glass objects, ceramic objects, glass objects, plastic objects, or combinations thereof. In further or alternative embodiments, the surfaces of such non-thermoplastic olefin portions/features/objects become partially covered, or become fully covered by the uncured coating. In any of these embodiments, at least one monomer in the curable composition swells the thermoplastic olefin material (which may be optionally unprimed) thereby improving adhesion of the cured coating.

In further or alternative embodiments, the coated surfaces of thermoplastic olefin objects (which may have been optionally unprimed) are partially cured by exposure of uncured coated surfaces to a first source of actinic radiation. In further or alternative embodiments, the coated surfaces are fully cured by exposure of the partially cured coated surface to a second source of actinic radiation. In further or alternative embodiments, the fully cured surfaces are hard, impact resistant, abrasion resistant, scratch resistant, stain resistant, chemical resistant, solvent resistant, fire resistant, with improved adhesion properties, light stability, UV stability, gloss and clarity. In further or alternative embodiments, the composition upon curing as a coating on a thermoplastic olefin object (which may have been optionally unprimed) remains intact after the thermoplastic olefin object is struck by another object, even if the thermoplastic olefin object is permanently deformed. In any of these embodiments, at least one monomer in the curable composition has swelled at least a portion of the thermoplastic olefin material (which may have been optionally unprimed) thereby improving adhesion of the cured coating.

In further or alternative embodiments, the actinic radiation is selected from the group consisting of visible radiation, near visible radiation, ultra-violet (UV) radiation, and combinations thereof. Further, the UV radiation is selected from the group consisting of UV-A radiation, UV-B radiation, UV-B radiation, UV-C radiation, UV-D radiation, or combinations thereof.

In further or alternative embodiments, the completely cured coated thermoplastic olefin object surface (which may have been optionally unprimed) is part of articles of manufacture. In further or alternative embodiments, the articles of manufacture include the completely cured coated surface. In further or alternative embodiments, the article of manufacture coated may be an article of manufacture wherein at least one of its functions would be enhanced or improved by the presence of a hard, impact resistant, abrasion resistant, scratch resistant, stain resistant, chemical resistant, solvent resistant, fire resistant coating with improved adhesion properties, light stability, UV stability, gloss and clarity. In further or alternative embodiments, the article of manufacture may be selected from motor-vehicle accessories; pieces of sports equipment, pieces of recreational equipment; toys, casings for electronic products, packaging for food; packaging for chemical products; business machines; pieces of laboratory equipment, and pieces of medical equipment. In further or alternative embodiments, the article of manufacture may be motor-vehicle accessory selected from the group consisting front bumpers, rear bumpers, bumper valances, door claddings, stone guards, wheel moldings, airbag assembly inserts, airbag covers, bumper fascia, bumper filler strips, exterior grilles, interior door panels, dash panels, and body side claddings. In further or alternative embodiments, the article of manufacture may be motor-vehicle accessories and the motor vehicles are selected from automobiles, buses, trucks, tractors, motorcycles, recreational vehicles, and off-road vehicles.

In a further aspect the method for producing the actinic radiation curable composition involves adding the components, for instance, by way of example only, at least one monomer, at least one photoinitiator, optionally at least one nano-filler, optionally at least on surfactant, optionally at least one oligomer, and optionally at least one polymerizable pigment dispersion, and using a means for mixing the components together to form a smooth composition. In further or alternative embodiments, the composition may be mixed in or transferred to a suitable container, such as, but not limited to, a can.

In another aspect are assemblages for coating at least a portion of a surface of thermoplastic olefin objects (which may be optionally unprimed) with an actinic radiation curable composition comprising a means for applying to the object an actinic radiation curable composition; a means for irradiating the applied coating with a first actinic radiation so as to partially cure the applied coating on the surface; and a means for irradiating the object with a second actinic radiation so as to completely cure the partially cured coating on the surface, wherein the composition when cured as a coating on a thermoplastic olefin material is an abrasion and scratch resistant coating having at least one property selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In any of these embodiments, at least one monomer in the curable composition is in contact with the thermplastic olefin surface for sufficient time to swell at least a portion of the thermoplastic olefin material (which may have been optionally unprimed) thereby improving adhesion of the cured coating.

In an embodiment of the this aspect, the composition when cured as a coating on a thermoplastic olefin material (which may have been optionally unprimed) is an abrasion and scratch resistant coating having at least two properties selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In further or alternative embodiments, the composition when cured as a coating on a thermoplastic olefin material (which may have been optionally unprimed) is an abrasion and scratch resistant coating having at least three properties selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In further or alternative embodiments, the composition when cured as a coating on a thermoplastic olefin material (which may have been optionally unprimed) is an abrasion and scratch resistant coating having (a) at least 4H hardness; (b) no yellowing after 7 weeks of accelerated UV radiation testing; (c) 99+% adhesion; and (d) total light transmittance of 80 to 100% at scattering angles of 0.1 to 10°.

In one embodiment of such assemblages, the actinic radiation curable composition is comprised of a mixture of at least one monomer, at least one photoinitiator, optionally at least one nano-filler, optionally at least one oligomer, optionally at least one surfactant, and optionally at least one polymerizable pigment dispersion. In a further embodiment, the means for irradiating so as to partially cure the coated surface and the means for irradiating so as to completely cure the coated surface are located at an irradiation station so as to not require the transport of the object. In still a further embodiment, the means for applying the composition is located at an application station, wherein the object must be moved from the application station to the irradiation station. In yet a further embodiment, such assemblages further comprise a means for moving the object from the application station to the irradiation station. In still yet a further embodiment, the means for moving comprises a conveyer belt.

In further or alternative embodiments, the irradiation station comprises a means for limiting the exposure of actinic radiation to the application station. In yet further or alternative embodiment, assemblages further comprise a means for rotating the object around at least one axis. In yet further or alternative embodiment, assemblages further comprise a mounting station wherein the object to be coated is attached to a movable unit. In further embodiments, the movable unit is capable of rotating the object around at least one axis. In further or alternative embodiments, the movable unit is capable of moving the object from the application station to the irradiation station.

In still further or alternative embodiments, such assemblages further comprise a removal station wherein the completely cured coated object is removed from the movable unit. In further embodiments, the completely cured coated object does not require cooling prior to removal from the movable unit.

In further or alternative embodiments, the means for applying includes spraying means, brushing means, rolling means, dipping means, blade coating, and curtain coating means. In further embodiments, the means for applying includes a spraying means. In still further embodiments, the spraying means includes equipment for high volume low pressure (HVLP) spraying. In further or alternative embodiments, the means for applying occurs at ambient temperature. In further or alternative embodiments, the spraying means includes equipment for electrostatic spraying. In further or alternative embodiments, the spraying means includes equipment for air-assisted/airless spraying.

In further or alternative embodiments, the application station further comprises a means for reclaiming actinic radiation curable composition that is non-adhering to the surface of the object. In still further embodiments, the reclaimed actinic radiation curable composition is subsequently applied to a different object.

In an embodiment of such assemblages for coating at least a portion of a surface, the actinic radiation curable composition comprises at least one monomer or a multiplicity of monomers present in the mixture between about 75–98% by weight. In a further or alternative embodiments, the actinic radiation curable, composition comprises at least one photoinitiator or a multiplicity of photoinitiators present in the mixture between about 2–10% by weight. In further or alternative embodiments, the actinic radiation curable composition optionally comprises up to about 10% by weight of at least one oligomer or a multiplicity of oligomers. In still further or alternate embodiments, the actinic radiation curable composition optionally comprises up to about 17% by weight of at least one nano-filler or a multiplicity of nano-fillers. In further or alternative embodiments, the actinic radiation curable composition optionally comprises up to about 2% by weight of at least one surfactant or a multiplicity of surfactants present in the mixture. In further or alternative embodiments, the actinic radiation curable composition optionally comprises up to about 15% by weight of a polymerizable pigment dispersion or a multiplicity of polymerizable pigment dispersions. In still further or alternative embodiments, the actinic radiation curable composition mixture comprises 75–98% percent by weight of an monomer or a multiplicity of monomers, and 2–10% by weight of a photoinitiator or a multiplicity of photoinitiators. In further or alternative embodiments of this aspect, the actinic radiation curable composition comprises 75–98% percent by weight of an monomer or a multiplicity of monomers, 2–10% by weight of a photoinitiator or a multiplicity of photoinitiators, and up to about 10% by weight of an oligomer or a multiplicity of oligomers. In still further or alternative embodiments, the actinic radiation curable composition comprises 75–98% percent by weight of an monomer or a multiplicity of monomers, 2–10% by weight of a photoinitiator or a multiplicity of photoinitiators, up to about 10% by weight of an oligomer or a multiplicity of oligomers, and up to about 17% by weight of a nano-filler or a multiplicity of nano-fillers. In further or alternative embodiments, the actinic radiation curable composition comprises 75–98% percent by weight of an monomer or a multiplicity of monomers, 2—10% by weight of a photoinitiator or a multiplicity of photoinitiators, up to about 10% by weight of an oligomer or a multiplicity of oligomers, up to about 17% by weight of a nano-filler or a multiplicity of nano-fillers, and up to about 15% by weight of a polymerizable pigment dispersion or a multiplicity of polymerizable pigment dispersions. In further or alternative embodiments, the actinic radiation curable composition comprises 75–98% percent by weight of an monomer or a multiplicity of monomers, 2–10% by weight of a photoinitiator or a multiplicity of photoinitiators, up to about 10% by weight of an oligomer or a multiplicity of oligomers, up to about 17% by weight of a nano-filler or a multiplicity of nano-fillers, up to about 15% by weight of a polymerizable pigment dispersion or a multiplicity of polymerizable pigment dispersions, and up to about 2% by weight of a surfactant or a multiplicity of surfactants; whereby the room temperature viscosity of the composition is about 30 centipoise.

In further or alternative embodiments, the first actinic radiation of the assemblage for coating at least a portion of a surface includes actinic radiation selected from the group consisting of visible radiation, near visible radiation, ultraviolet (UV) radiation, and combinations thereof. In further or alternative embodiments, the second actinic radiation of the assemblage for coating at least a portion of a surface includes actinic radiation selected from the group consisting of visible radiation, near visible radiation, ultra-violet (UV) radiation, and combinations thereof. In further or alternative embodiments, the irradiation station includes an arrangement of mirrors.

In further or alternative embodiments of this aspect, the objects being coated are motor vehicle bumpers.

In another aspect are processes for coating a at least a portion of surface of thermoplastic olefin objects (which may have been optionally unprimed) with an actinic radiation curable composition comprising attaching the object onto a conveying means; applying an actinic radiation curable composition at an application station onto the surface of the object; moving the coated object via the conveying means to an irradiation station; irradiating and partially curing the coated surface at the irradiation station with a first actinic radiation; and irradiating and completely curing the coated surface at the irradiation station with a second actinic radiation; wherein the composition when cured as a coating on a thermoplastic olefin material (which may have been optionally unprimed) is an abrasion and scratch resistant coating having at least one property selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In any of these embodiments, at least one monomer in the curable composition is in contact with the thermplastic olefin surface for sufficient time to swell at least a portion of the thermoplastic olefin material (which may have been optionally unprimed) thereby improving adhesion of the cured coating.

In an embodiment of the this aspect, the composition when cured as a coating on a thermoplastic olefin material (which may have been optionally unprimed) is an abrasion and scratch resistant coating having at least two properties selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In further or alternative embodiments, the composition when cured as a coating on a thermoplastic olefin material (which may have been optionally unprimed) is an abrasion and scratch resistant coating having at least three properties selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In further or alternative embodiments, the composition when cured as a coating on a thermoplastic olefin material (which may have been optionally unprimed) is an abrasion and scratch resistant coating having (a) at least 4H hardness; (b) no yellowing after 7 weeks of accelerated UV radiation testing; (c) 99+% adhesion; and (d) total light transmittance of 80 to 100% at scattering angles of 0.1 to 10°.

In further embodiments, such processes further comprise attaching the thermoplastic olefin object (which may have been optionally unprimed) to a rotatable spindle prior to the application step. In further or alternative embodiments, such processes further comprise moving the conveying means after attaching the thermoplastic olefin object to the rotatable spindle so as to locate the object near an application station. In further embodiments, such processes further comprise applying an actinic radiation curable composition at the application station as the spindle holding the thermoplastic olefin object rotates. In further embodiments, the conveying means comprises a conveyer belt.

In further or alternative embodiments, the irradiation station comprises a curing chamber containing a first actinic radiation source and a second actinic radiation source.

In further embodiments, such processes further comprise moving the completely cured coated thermoplastic olefin object (which may have been optionally unprimed) via the conveying means outside the curing chamber wherein the coated thermoplastic olefin object is packed for storage or shipment.

In one embodiment of such processes for coating at least a portion of a surface of thermoplastic olefin objects (which may have been optionally unprimed), the actinic radiation curable composition comprises at least one monomer or a multiplicity of monomers present in the mixture between about 75–98% by weight. In further or alternative embodiments, the actinic radiation curable, composition comprises at least one photoinitiator or a multiplicity of photoinitiators present in the mixture between about 2–10% by weight. In further or alternative embodiments, the actinic radiation curable composition optionally comprises up to about 10% by weight of at least one oligomer or a multiplicity of oligomers. In still further or alternate embodiments, the actinic radiation curable composition optionally comprises up to about 17% by weight of at least one nano-filler or a multiplicity of nano-fillers. In further or alternative embodiments, the actinic radiation curable composition optionally comprises up to about 2% by weight of at least one surfactant or a multiplicity of surfactants present in the mixture. In further or alternative embodiments, the actinic radiation curable composition optionally comprises up to about 15% by weight of a polymerizable pigment dispersion or a multiplicity of polymerizable pigment dispersions. In still further or alternative embodiments, the actinic radiation curable composition mixture comprises 75–98% percent by weight of an monomer or a multiplicity of monomers, and 2–10% by weight of a photoinitiator or a multiplicity of photoinitiators. In further or alternative embodiments of this aspect, the actinic radiation curable composition comprises 75–98% percent by weight of an monomer or a multiplicity of monomers, 2–10% by weight of a photoinitiator or a multiplicity of photoinitiators, and up to about 10% by weight of an oligomer or a multiplicity of oligomers. In still further or alternative embodiments, the actinic radiation curable composition comprises 75–98% percent by weight of an monomer or a multiplicity of monomers, 2–10% by weight of a photoinitiator or a multiplicity of photoinitiators, up to about 10% by weight of an oligomer or a multiplicity of oligomers, and up to about 17% by weight of a nano-filler or a multiplicity of nano-fillers. In further or alternative embodiments, the actinic radiation curable composition comprises 75–98% percent by weight of an monomer or a multiplicity of monomers, 2–10% by weight of a photoinitiator or a multiplicity of photoinitiators, up to about 10% by weight of an oligomer or a multiplicity of oligomers, up to about 17% by weight of a nano-filler or a multiplicity of nano-fillers, and up to about 15% by weight of a polymerizable pigment dispersion or a multiplicity of polymerizable pigment dispersions. In further or alternative embodiments, the actinic radiation curable composition comprises 75–98% percent by weight of an monomer or a multiplicity of monomers, 2–10% by weight of a photoinitiator or a multiplicity of photoinitiators, up to about 10% by weight of an oligomer or a multiplicity of oligomers, up to about 17% by weight of a nano-filler or a multiplicity of nano-fillers, up to about 15% by weight of a polymerizable pigment dispersion or a multiplicity of polymerizable pigment dispersions, and up to about 2% by weight of a surfactant or a multiplicity of surfactants; whereby the room temperature viscosity of the composition is about 30 centipoise.

In further or alternative embodiments, the application station comprises equipment for electrostatic spray. In further or alternative embodiments, the application station comprises equipment suitable for air-assisted/airless spraying. In further or alternative embodiments, the application station comprises equipment suitable for High Volume Low Pressure (HVLP) coatings application. In either case, further or alternative embodiments include processes wherein the coating is applied in a single application, or the coating is applied in multiple applications. Further, in either case, further or alternative embodiments include processes wherein the surface is partially covered by the coating, or the surface is fully covered by the coating.

In further or alternative embodiments, the time between the first actinic radiation step and the second actinic radiation step is less than 5 minutes. In further embodiments, the time between the first actinic radiation step and the second actinic radiation step is less than 1 minute. In further embodiments, the time between the first actinic radiation step and the second actinic radiation step is less than 15 seconds.

In further or alternative embodiments, the length of time of the first actinic radiation step is shorter than the length of time of the second actinic radiation step. In further or alternative embodiments, the length of time of the first actinic radiation step is longer than the length of time of the second actinic radiation step. In further or alternative embodiments, the length of time of the first actinic radiation step is identical to the length of time of the second actinic radiation step.

In further or alternative embodiments, the irradiation station includes at least one light capable of providing actinic radiation selected from the group consisting of visible radiation, near visible radiation, ultra-violet (UV) radiation, and combinations thereof.

In further or alternative embodiments, the irradiation station includes at least one light source capable of providing actinic radiation selected from the group consisting of UV-A radiation, UV-B radiation, UV-B radiation, UV-C radiation, UV-D radiation, or combinations thereof.

In further or alternative embodiments, the irradiation station includes an arrangement of mirrors such that the coated surface is cured in three dimensions. In further or alternative embodiments, the irradiation station includes an arrangement of light sources such that the coated surface is cured in three dimensions. In further embodiments, each light source emits different spectral wavelength ranges. In further embodiments, the different light sources have partially overlapping spectral wavelength ranges.

In another aspect are production lines for coating at least a portion of a surface of thermoplastic olefin objects (which may have been optionally unprimed) with an actinic radiation curable composition comprising a process which comprises attaching the thermoplastic olefin object onto a conveying means; applying an actinic radiation curable composition at an application station onto the surface of the thermoplastic olefin object; moving the coated thermoplastic olefin object via the conveying means to an irradiation station; irradiating and partially curing the coated surface at the irradiation station with a first actinic radiation; and irradiating and completely curing the coated surface at the irradiation station with a second actinic radiation; wherein the composition when cured as a coating on a thermoplastic olefin material is an abrasion and scratch resistant coating having at least one property selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In any of these embodiments, at least one monomer in the curable composition is in contact with the thermplastic olefin surface for sufficient time to swell at least a portion of the thermoplastic olefin material (which may have been optionally unprimed) thereby improving adhesion of the cured coating.

In an embodiment of the this aspect, the composition when cured as a coating on a thermoplastic olefin material (which may have been optionally unprimed) is an abrasion and scratch resistant coating having at least two properties selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In further or alternative embodiments, the composition when cured as a coating on a thermoplastic olefin material (which may have been optionally unprimed) is an abrasion and scratch resistant coating having at least three properties selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In further or alternative embodiments, the composition when cured as a coating on a thermoplastic olefin material (which may have been optionally unprimed) is an abrasion and scratch resistant coating having (a) at least 4H hardness; (b) no yellowing after 7 weeks of accelerated UV radiation testing; (c) 99+% adhesion; and (d) total light transmittance of 80 to 100% at scattering angles of 0.1 to 10°.

In another aspect are facilities or factories for producing thermoplastic olefin objects (which may have been optionally unprimed) coated at least in part with an actinic radiation cured composition comprising at least one production line for coating a surface of a thermoplastic olefin object with an actinic radiation curable composition comprising a process comprising attaching the object onto a conveying means; applying an actinic radiation curable composition at an application station onto the surface of the object; moving the coated object via the conveying means to an irradiation station; irradiating and partially curing the coated surface at the irradiation station with a first actinic radiation; and irradiating and completely curing the coated surface at the irradiation station with a second actinic radiation; wherein the composition when cured as a coating on a thermoplastic olefin material is an abrasion and scratch resistant coating having at least one property selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In any of these embodiments, at least one monomer in the curable composition is in contact with the thermplastic olefin surface for sufficient time to swell at least a portion of the thermoplastic olefin material (which may have been optionally unprimed) thereby improving adhesion of the cured coating.

In an embodiment of the this aspect, the composition when cured as a coating on a thermoplastic olefin material (which may have been optionally unprimed) is an abrasion and scratch resistant coating having at least two properties selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In further or alternative embodiments, the composition when cured as a coating on a thermoplastic olefin material (which may have been optionally unprimed) is an abrasion and scratch resistant coating having at least three properties selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In further or alternative embodiments, the composition when cured as a coating on a thermoplastic olefin material (which may have been optionally unprimed) is an abrasion and scratch resistant coating having (a) at least 4H hardness; (b) no yellowing after 7 weeks of accelerated UV radiation testing; (c) 99+% adhesion; and (d) total light transmittance of 80 to 100% at scattering angles of 0.1 to 10°.

In further or alternative embodiments, the thermoplastic olefin objects (which may have been optionally unprimed) coated on the production lines in the facilities are motor-vehicle bumper, wherein the completely cured coated surface of the motor-vehicle bumpers is abrasion and scratch resistant and exhibits at least one property selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In further or alternative embodiments, the composition when cured as a coating on a thermoplastic olefin motor-vehicle bumpers (which may have been optionally unprimed) is an abrasion and scratch resistant coating having at least two properties selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In further or alternative embodiments, the composition when cured as a coating on a thermoplastic olefin motor-vehicle bumpers (which may have been optionally unprimed) is an abrasion and scratch resistant coating having at least three properties selected from the group consisting of (a) at least 4H hardness; (b) no yellowing after 7 weeks of accelerated UV radiation testing; (c) 99+% adhesion; and (d) total light transmittance of 80 to 100% at scattering angles of 0.1 to 10°. In further or alternative embodiments, the composition when cured as a coating on a thermoplastic olefin motor-vehicle bumpers (which may have been optionally unprimed) is an abrasion and scratch resistant coating having (a) at least 4H hardness; (b) no yellowing after 7 weeks of accelerated UV radiation testing; (c) 99+% adhesion; and (d) total light transmittance of 80 to 100% at scattering angles of 0.1 to 10°.

INCORPORATION BY REFERENCE

All publications, patents and patent applications mentioned in this specification are herein incorporated by reference in their entirety to the same extent as if each individual publication, patent or patent application was specifically and individually indicated to be incorporated by reference.

BRIEF DESCRIPTION OF THE FIGURES

A better understanding of the features and advantages of the present methods and compositions may be obtained by reference to the following detailed description that sets forth illustrative embodiments, in which the principles of our methods, compositions, devices and apparatuses are utilized, and the accompanying drawings of which.

DETAILED DESCRIPTION OF THE INVENTION

Figure 1:
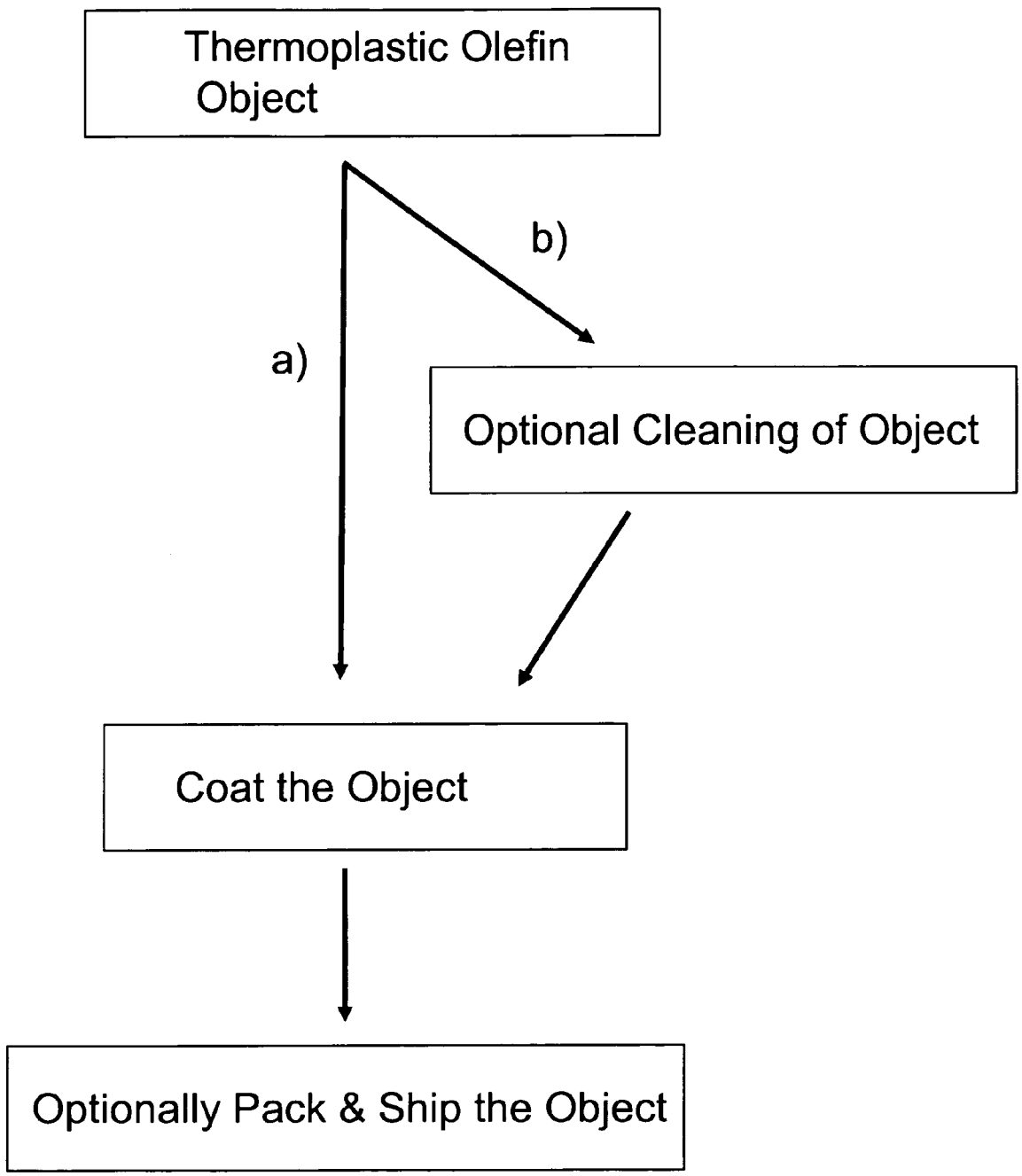
FIG. 1 is a flowchart of one possible process for coating thermoplastic olefin objects with coating compositions described herein.

The actinic radiation curable coating compositions, methods of applying the compositions, coated surfaces and coated articles described herein, materially enhance the quality of the environment by incorporation of components which are zero or near zero volatile organic compounds (VOC's). Further, such components are essentially non-volatile and therefore have zero or near zero emissions. Still further, the coating compositions described herein may be applied to an unprimed thermoplastic olefin surfaces, thus obviating the need to apply volatile priming agents. Such a decrease in emissions significantly decreases air pollution, especially in comparison to the air pollution encountered with coating composition using volatile solvents. In addition, any water and soil pollution associated with waste disposal from processes using coating composition using volatile solvents is minimized using the methods described herein, thereby further contributing to and materially enhancing the quality of the environment. Furthermore, the actinic radiation curable coating compositions, methods, processes and assemblages for applying the compositions, coated surfaces and coated articles described herein, utilize significantly less energy than processes using coating composition using volatile solvents, thereby conserving energy.

GLOSSARY OF TERMS

The term "actinic radiation" as used herein, refers to any radiation source which can produce polymerization reactions, such as, by way of example only, ultraviolet radiation, near ultraviolet radiation, and visible light.

The term "cure," as used herein, refers to polymerization, at least in part, of a coating composition.

The term "curable," as used herein, refers to a coating composition which is able to polymerize at least in part.

The term "filler" refers to a relatively inert substance, added to modify the physical, mechanical, thermal, or electrical properties of a coating.

The term "irradiating," as used herein, refers to exposing a surface to actinic radiation.

The term "milling" as used herein, refers to the processes of premixing, melting and grinding a powder coating formulation to obtain a powder suitable for spraying.

The term "monomers," as used herein, refers to substances containing single molecules that can link to oligomers and to each other.

The term "motor vehicle," as used herein, refers to any vehicle which is self-propelled by mechanical or electrical power. Motor vehicles, by way of example only, include automobiles, buses, trucks, motorcycles, tractors, recreational vehicles, and off-road vehicles.

The term "oligomers," as used herein, refers to molecules containing several repeats of a single molecule.

The term "photoinitiators," as used herein, refers to compounds that absorb ultra-violet light and use the energy of that light to promote the formation of a dry layer of coating.

The term "polymerizable pigment dispersions," as used herein, refers to pigments attached to polymerizable resins which are dispersed in a coating composition.

The term "polymerizable resin" or "activated resin," as used herein, refers to resins which possess reactive functional groups.

The term "pigment," as used herein, refers to compounds which are insoluble or partially soluble, and are used to impart color.

The term "scratch" as used herein, refers to physical deformations resulting from mechanical or chemical abrasion."

The term "scratch resistance" as used herein, refers to the ability of a material to resist damage that can lead to visible, deep or wide trenches. Thus, scratches are generally regarded as being more severe than what is referred to in the art as mar.

The term "slip and flow enhancer," as used herein, refers to component or components, which enhance or partially enhance the flow and slip characteristics of a coating.

The terms "slip" and "slick" as used herein, refer to surfaces which have a low coefficient of friction two which allows contacting surfaces to easily move by each other.

The term "vehicle" as used herein, refers to the liquid portion of solvent based formulations, and can incorporate both the solvent and the resin.

Coating Plastics

Many products, or component of products, may be made of plastic. These plastic components and products include, but are not limited to, motor-vehicle parts/accessories, sporting and recreational goods, toys, casings for electronic products, packaging for food, packaging for chemical products, business machines, laboratory and medical equipment, household products, and other consumer products.

In some cases, such products or components may be pigmented during the molding process. The process is known as an in-mold coating operations, wherein a gel coatings is applied to a mold during the manufacture of plastic parts. Alternatively, some plastic components and products require surface coatings to impart functional, protective, decorative, or adhesive properties, and wherein the coatings have been applied to plastic parts and products through a post-mold coating process. Most coating operations are located at plant sites that are dedicated to surface coating, or are co-located with some other activity, such as but not limited to, automobile assembly plants that coat plastic automobile parts or accessories off the assembly line.

Markets for the end-products of the plastic parts surface coating industry include the motor-vehicle industry, the recreation industry, sporting goods industry, business machines industry, toy manufacturing, laboratory equipment, household and other consumer products, and other transportation products. Within the motor-vehicle industry, some facilities are dedicated to coating very specific types of product such as bumpers and instrument panels.

In general the surface coating of plastic parts and products, including adhesive and non-adhesive coatings, involves the use of solvent based coating compositions. Such compositions contain volatile organic compounds (VOC's), which are regarded as hazardous air pollutants (HAP's), which have concerns regarding health and environmental damage. Not only are such VOC's incorporated into the solvent based coating compositions, other procedures used for surface coating may also involve the use or handling of such solvents. There are several sources of volatile organic HAP emissions at facilities for surface coating plastic parts and products. These sources include the coating application stage of the process, flash-off and curing steps associated with applying solvent based coatings to plastic parts, the storage and handling of organic materials including coatings and solvents, the mixing of organic coatings and solvents, and equipment cleaning and surface preparation operations that often involve organic solvents and materials. In addition, the handling and disposal of any waste is also an emission source.

Thermoplastic Olefin (TPO)

Olefinic substrates are non-polar plastics that include polypropylene, thermoplastic olefins (TPO), ethylene-propylene-diene-modified rubber (EPDM) and other ethylenepropylene copolymers. Olefinic plastics can be used for highly-visible automotive applications such as bumper fascias, bumper filler strips, exterior grilles, and interior door and dash panels and airbag covers. Some of these parts may have specific performance requirements to protect vehicle passengers or to minimize damage from minor contact with other objects. Non-limiting examples include flexibility at low temperatures for air bag covers, and abrasion and scratch resistance for bumper fascia.

Thermoplastic olefins (TPO) may be used to manufacture motor-vehicle accessories, also referred to as motor-vehicle parts, such as, but not limited to, front and rear bumpers, bumper valances, door cladding, stone guards, wheel moldings, airbag assembly inserts and covers, bumper fascias, bumper filler strips, exterior grilles, interior door and dash panels, and body side claddings. TPO may also be used as the skins for instruments, single-ply roofing membranes, pipe boots and pre-fabricated accessories. The shapes of the objects may range from simple shapes, to complex angular shapes, to flat panels. In addition, some TPO objects may be flexible. In some cases the TPO product is surface coated to add decorative features and/or to impart functionality such as, but not limited to, hardness, abrasion and scratch resistance, impact resistance, stain resistance, chemical resistance, solvent resistance, fire resistance and other protection from wear and tear. In addition, the coating may be required to have adhesion properties, high durability, be flexible, and have light or UV stability. Providing Coatings to TPO Surface finishing/coating of injection-molded, extruded or laminated TPO products has been problematic due to problems with top coat adhesion. Therefore, the TPO products require surface modification to achieve acceptable levels of adhesion of the top coat. Adhesion enhancement can be achieved through the use of adhesion promoters, grafted connector molecules chemically attached to the TPO surface, or "flaming" of the TPO surface. Adhesion promoters used to prime TPO are generally non-polar solvents which allow primers to wet-out and adhere to the non-polar TPO substrates. The surface tensions of organic HAP solvents such as toluene, xylene, and other non-polar aromatic solvents are ideal for wetting TPO, whereas in contrast the surface tension of polar non-HAP solvents are too high to allow primers to wet-out the TPO surface.

In addition to adequate wetting of the TPO surface, the adhesion promoter solvents migrate through the surface of the TPO and swell the rubber elastomer component in the TPO. The swelling of the elastomer in the TPO and the subsequent entanglement of the elastomer with the paint provides the adhesion necessary to adequately coat TPO surfaces. However, many non-HAP solvents either evaporate too quickly to adequately migrate through and swell the elastomer in the TPO, or the solvents swell the elastomer to the point of distortion of the part. Therefore, adhesion promoters used in TPO coating operations contain high levels of non-polar organic HAP solvents to achieve adequate wetting of the substrate and swelling of the elastomer rubber to provide good adhesion between the paint and the substrate.

TPO adhesion promoters are generally applied in very thin films to achieve the best performance. Consequently the application of a thin film requires the use of a very low-solids coating, and application of higher solids content adhesion promoters as consistent thin films is difficult. Additionally, if the adhesion promoter is applied too thinly, the topcoat will not adhere to the TPO substrate, whereas, if the adhesion promoter is applied too thickly it will tend to crack. Finally, the associated topcoats, color coats, and cleaning materials used in conjunction with the adhesion promoters are chosen to be compatible with the adhesion promoter.

The use of non-polar organic HAP solvents as adhesion promoters has health, safety, and environmental issues. Also, TPO coating operations have HAP emission concerns, wherein the sources of organic HAP emissions from coating facilities include mixing operations, storage and handling of organic HAP materials, equipment cleaning operations, surface preparation operations, thinning of coating materials, coating application, and waste handling.

Waterborne coating compositions are also feasible for coating TPO substrates, however, waterborne coatings also use non-polar HAP solvents as adhesion promoters, wherein the sources of organic HAP emissions from coating facilities include mixing operations, storage and handling of organic HAP materials, equipment cleaning operations, surface preparation operations, thinning of coating materials, coating application, and waste handling.

Solvent-Based Coatings

Solvent-based coating formulations generally incorporate four basic materials: pigments, resins (binder), solvents, and additives. Homogeneous pigment dispersions can be created by efficient mixing of insoluble raw pigment particle in the vehicle (liquid portion of solvent based formulations), and thereby create opaque coatings. The resin makes up the non-volatile portion of the vehicle, and aids in adhesion, determines coating cohesiveness, affects gloss, and provides resistance to chemicals, water, and acids/bases. Three types of resins are generally used: multiuse resins (acrylics, vinyls, urethanes, polyesters); thermoset resins (alkyds, epoxides); and oils. The type of solvent used in such formulations depends on the resin and is either an organic solvent (such as alcohols, esters, ketones, glycol ethers, methylene chloride, trichloroethane, and petroleum distillates), or water.

Organic solvents are used in solvent-based coating compositions to both thin/dilute the compositions, and to evenly disperse the composition over the surface and then evaporate quickly. However, due to their high volatility such organic solvents create high emission concentrations and as such are classified as VOC's and HAP's. These solvent emissions are of concern to employers and employees in facilities in which such VOC's and HAP's are used, as overexposure can cause renal damage or other health related difficulties. In addition, environmental impact, and potential fire hazards are other issues to consider when using coatings which incorporate organic solvents. Furthermore, coatings which incorporate organic solvents require large curing ovens to initiate curing of the coating and to remove the solvent. All of these issues require a significant financial commitment from the coating end user, in terms of leasing or purchasing space for the large ovens, the cost of energy associated with the thermal curing process, possible medical expenses, potential environmental cleanup, and insurance premiums.

Thermoset Powder Coatings and UV-Curable Powder Coating

Alternatively, powder-based coating compositions and aqueous-based formulations were developed to address the issue of volatile emissions associated with non-aqueous solvent-based coating compositions. Powder-based coatings, which can include thermoset or UV-cure formulations, may decrease emissions, however due to the need for thermal melting, smoothing and curing (for thermoset powders), such powder-based coatings also require considerable time, space for large ovens, and energy. In addition, powder coatings also often display an "orange peel" appearance that may be undesirable. Solid resins which possess UV-reactive moieties, and retain the melt and flow characteristics needed to produce high quality coatings, allow for the creation of UV-curable powder coatings. These powder coatings combine the low energy, space efficient and fast cure characteristics observed with UV curing, with the convenience of powder coating application, such as electrostatic spraying. The use of UV curing effectively separates the melt and flow stages from the curing stage, however, there still remains the requirement of large ovens for the melt and flow stages, and the associated cost and space requirements needed to operate such ovens.

UV-Curable 100% Solids Coatings

100% solids UV curable coating compositions do not contain organic solvents, thereby limiting health, safety, and environmental risks posed by such volatile compounds. In addition, 100% solids UV curable coating compositions are easily applied to surfaces in a single coating (i.e. one-coat finish), which decreases product coating time and allows for immediate "pack and ship" capabilities, and thereby results in more efficient production processes. Also, such compositions cure quickly, without the use of large curing and drying ovens, which decreases production costs associated with owning/leasing space required for drying/curing ovens, along with the cost associated with the energy requirements for their operation.

Described herein are sprayable compositions, methods of using the compositions for coating surfaces of TPO objects, and the processes of coating surfaces of TPO objects. The compositions described herein are used to coat both the TPO surface and optionally, if present, any non-TPO surface. In addition, the compositions may be used to coat the surfaces of TPO objects which are already coated or partially coated. By way of example only, such partially coated or already coated TPO objects include painted TPO objects, enameled TPO objects, lacquered TPO objects.

The sprayable compositions described herein do not contain organic solvents to dilute or thin the composition, and are therefore referred to as high solids content compositions. The high solids content coating compositions comprise actinic radiation curable monomers to improve adhesion without having to prime the TPO surface, plus photoinitiators are present to initiate the polymerization process and generate the coating. The use of other components may be added to impart desired composition flow properties and cured coating characteristics. Such optional components are nano-fillers, surfactants and polymerizable pigment dispersions. Additionally, up to about 1%, 2%, 3%, 4%, 5%, 6%, 7%, 8%, 9%, or 10%, oligomer or mixture of oligomers can be optionally added to impart desired cured coating characteristics. The cured coating characteristics which may result from the optional components include, but are not limited to, hardness, impact resistance, abrasion resistance, scratch resistance, stain resistance, chemical resistance, solvent resistance, fire resistance, flexibility, light stability, UV stability, gloss and clarity.

The coating compositions described herein have improved wetting properties for TPO objects and do not use non-polar HAP solvents as adhesion promoters. The monomers behave as adhesion promoters and also become part of the cured coatings. This is in contrast to approaches which use solvent based coating compositions to coat TPO substrates, wherein non-polar HAP solvents are used as low solids content adhesion promoter, followed by a separate composition applied and cured as a top coat.

The high solids content, UV-curable coating compositions described herein do not use added solvent. This is achieved, in part, by the use of low molecular weight monomers which take the place of organic solvents. However, these monomers are not as volatile as organic solvents, and therefore do not evaporate as readily as volatile organic solvents. In addition, the monomers are able penetrate TPO objects while effectively wetting the TPO surfaces. The improved wetting properties allow for coverage of TPO surfaces with uniform coatings in single application steps, while the ability to migrate through the surface of the TPO provides improved adhesion to TPO surfaces. Improved adhesion results from swelling at least a portion of the rubber elastomer component of TPO which allows for subsequent entanglement of the TPO elastomer with the polymerized monomer obtained during the UV curing step. Thus the monomers of the compositions described herein are adhesion promoters and also become a component of the final coating, contributing to the final coating properties and characteristics. This is in contrast to approaches which use non-polar HAP solvents are used as low solids content adhesion promoter and which use non-polar HAP solvents are used as low solids content adhesion promoter and solvent based coating compositions as a top-coat coating compositions as a top-coat, or approaches which use pretreatment of TPO surfaces, such as, but not limited to "flaming," prior to top coating with solvent based coating compositions.

The coating compositions described herein may be sprayed by conventional methods, including, but not limited to, High Volume Low Pressure (HVLP), air-assisted/airless, or electrostatic bell in one coat, with no additional heat applied. In addition, the compositions described herein may further comprise solid pigment dispersions, surfactants, and fillers. The coating compositions described herein can be either opaque or have a clear coat finish and may impart the following characteristics to TPO objects: hardness, impact resistance, abrasion resistance, scratch resistance, stain resistance, chemical resistance, solvent resistance, fire resistance, improved adhesion properties, high durability, flexibility, light stability, UV stability, gloss, clarity, and combinations thereof.

The high solids content coating compositions described herein are easily applied to surfaces and cure quickly by exposure to UV, without the use of large curing and drying ovens; thereby, decreasing production costs associated with owning/leasing space required for drying/curing ovens, along with the energy cost associated with the operation of drying/curing ovens. In addition, such UV-curable coating compositions can be applied in a single coating (i.e. one-coat), which decreases the coating time, allows for immediate "pack and ship" capabilities, thereby improving production efficiency. Also, the lack of volatile organic solvents in such UV-curable coating compositions limits health, safety, and environmental risks posed by HAP solvents.

The high solids content, UV-curable coating compositions described herein can be used to coat TPO objects, or to coat objects comprising TPO components; all of which may have shapes which range from simple shapes, to complex shapes with angular features, to flat panels. The compositions described herein can be used to coat TPO objects which are articles of manufacture, such as, but not limited to, motor-vehicle parts/accessories, sporting and recreational goods, toys, casings for electronic products, packaging for food, packaging for chemical products, business machines, laboratory and medical equipment, household products, skins for instruments, single-ply roofing membranes, pipe boots and pre-fabricated accessories, and other consumer products. In addition, the TPO motor-vehicle parts/accessories which may be coated using the compositions described herein include, but not limited to, front and rear bumpers, bumper valances, door cladding, stone guards, wheel moldings, airbag assembly inserts and covers, bumper fascias, bumper filler strips, exterior grilles, interior door and dash panels, and body side claddings.

The resulting cured coatings obtained from the high solids content, UV-curable coating compositions described herein exhibit improved adhesion properties, enhanced slip and flow properties, improved gloss, high durability, flexibility and/or hardness, and impart to the coated object impact resistance, abrasion resistance, scratch resistance, stain resistance, solvent resistance, chemical resistance, fire resistance, and resistance to fading and/or discoloration due to sunlight exposure, and/or UV exposure, and/or air oxidation, and combinations thereof. In addition, the cured coating is an effective moisture barrier.

Milling refers to the powder manufacture processes of premixing, melting and grinding the powder coating formulation to obtain a powder suitable for spraying onto a surface. The addition of these steps to the coating process results in increased time and energy expenditures per article of manufacture coated. Removal of these steps streamlines the coating process and removes the associated milling costs, thus improving overall productivity and lowering business expenditures.

Pigment color properties such as strength, transparency/opacity, gloss, shade, rheology, and light and chemical stability, are generally affected to a greater or lesser extent by the size and distribution of the pigment particles in the vehicle in which they are embedded. Pigment particles normally exist in the form of primary particles (50 µm to 500 µm), aggregates, agglomerates and flocculates. Primary particles are individual crystals, whereas aggregate are collections of primary particles bound together at their crystal faces, and agglomerates are a looser type of arrangement with primary particles and aggregates joined at corners and edges. Flocculates consist of primary particle aggregates and agglomerates generally arranged in a fairly open structure, which can be broken down in shear. However, after the shear is removed, or a dispersion is allowed to stand undisturbed, the flocculates can reform. The relationship between pigment particle size and the ability of a pigment vehicle system to absorb visible electromagnetic radiation is referred to as the color or tinctorial strength. The ability of a given pigment to absorb light (tinctorial strength) increases with decreasing particle diameter, and accordingly increased surface area. Thus, the ability to maintain the pigment at a minimum pigment particle size will yield a maximum tinctorial strength. The primary purpose of a dispersion is to break down pigment aggregates and agglomerates into the primary particles, and therefore achieve optimal benefits of a pigment both visually and economically. When used in a coating composition pigment dispersions exhibit increased tinctorial strength and provide enhanced gloss. However, of concern in obtaining an optimal dispersion is the number of processes involved in creating the pigment dispersion, such as agitating, shearing, milling, and grinding. If these processes are not accurately controlled then the possibility exists for batch-to-batch color variation and poor color reproducibility.

The high solids content, UV-curable coating compositions described herein may use polymerizable pigment dispersions rather than raw pigments, thereby limiting the need for "milling." In addition, polymerizable pigment dispersions, which exhibit minimal aggregation and agglomeration, are simply mixed into the coating composition and thereby improve color reproducibility by removing the need for agitating, shearing, milling, and grinding in the manufacturing and/or coating process. Furthermore, due to the reactive functionality of the polymerizable pigment dispersion, during polymerization the pigment becomes an integral part of the resulting coating. This may impart greater color stability relative to pigment dispersions which simply entrap the pigment particles in the coating matrix. Thus, coatings which incorporate polymerizable pigment dispersions, such as those described herein, exhibit improved color reproducibility, and improved color stability, greater tinctorial strength and enhanced opacity and gloss. By way of example only, compositions described herein may be heavily pigmented and can exhibit acceptable opacity at thicknesses less than 50 microns.

Gloss essentially refers to the smoothness and shine of a surface, and both of these properties are important when considering the visual appearance and ultimate visual acceptability of a coating. As discussed above, the incorporation of polymerizable pigment dispersions into the coating composition can yield greater tinctorial strength and enhanced gloss. Furthermore, the incorporation of fillers in the coating composition, along with controlled polymerization conditions, can impart enhanced smoothness. The control of the polymerization process will be described in detail later, briefly however, it involves the use of mixtures of photoinitiators which possess different absorbance characteristics such that longer wavelength radiation can be used to excite a photoinitiator or photoinitiators of the mixture, while shorter wavelength radiation is used to excite the other photoinitiators of the mixture. In this manner, the order of excitation can be important. It is desirable that the longer wavelength photoinitiators are excited first, as this allows for improved adhesion and traps the filler components in place. The shorter wavelengths photoinitiators are then excited to complete the polymerization process. If this order of excitation is not used (or a variant thereof, such as alternating exposures, flashing or other sequences) the filler compounds can aggregate and create a matted finish. Thus, the long wavelength-short wavelength procedure can improve visual appearance and acceptability by enhancing the surface smoothness, enhancing the surface shine, or enhancing the surface smoothness and surface shine. However, if a matted appearance is desired, then a short wavelength-long wavelength procedure may be used.

An additional advantage resulting from using the methods and compositions described herein is that such compositions and methods result in the overall decrease in time required for applying, curing, and drying the coating. Although, conventional coating processes can be adapted to the coating compositions and methods described herein, the use of UV radiation, rather than heat, to initiate the polymerization process significantly decreases the curing time per article coated. However, the methods and compositions described herein may include low levels of heat; for example, lamps used to provide the UV light for curing may also generate some heat. In addition, heat may be generated from other sources (including the ambient temperature of a facility); however, the methods and compositions described herein require minimal, if any, additional heat in order to achieve appropriate curing. As discussed, the lack of solvent in the present compositions and methods removes the requirement for using heat to drive off solvent, a process which adds significant time and cost to the coating procedure. The use of UV light for curing, and the removal of solvent from the composition, dramatically decreases the time for completion of the total coating process for each article coated. Thus, the overall production time per part is decreased, and this can manifest itself in two ways. First, more parts can be processed in the same time needed for solvent-based methods, and second, fulfilling batch orders requires less time and therefore the costs associated with maintaining the production line will be lower.

The absence of curing and drying ovens in applications utilizing UV curing compositions allows for more efficient use of space. This has unique benefits depending on whether an existing production line is being modified, or a new production line is being designed. The ability to minimize the usage of space for production, whether it be floor space, wall space, or even ceiling space (in the situation when objects are hung from the ceiling), can be critical in terms of productivity, production costs and initial capital expenditure. The removal of the solvent from the UV-curable compositions described herein allows for the removal of large ovens from the production line. These ovens are used to cure and force the rapid evaporation of the solvent when using solvent-based coating compositions. Removing the ovens significantly decreases the volume (floor, wall, and ceiling space) required for the production system, and in effect utilizes less space for existing production lines. Furthermore, the expense associated with operating the ovens is no longer an issue and the result is decreased production costs. For new production lines, removal of these ovens from the design actually saves space, and hence a smaller building may be used to house the production line, thereby decreasing the construction costs. In addition, the capital expenditure for the new production line will be less because ovens are no longer required. For the case of pre-existing facilities, utilizing less space may allow the incorporation of multiple coating assembly lines in the space required by conventional, thermal-based assemblies. Thus, the methods and compositions described herein allow additional production lines per unit volume, and therefore increase productivity.

The coating methods and compositions described herein, and the associated coating production lines described herein, can be integrated with an associated production line for an article of manufacture. For instance, with the removal of large ovens associated with thermal-cure processes, streamlined coating production lines can be inserted into, by way of example only, the production line of motor-vehicle parts/accessories, sporting and recreational goods, toys, casings for electronic products, packaging for food, packaging for chemical products, business machines, laboratory and medical equipment, household products, skins for instruments, single-ply roofing membranes, pipe boots and pre-fabricated accessories, and the like.

The removal of HAP solvents from the high solids content, UV-curable coating compositions and/or coatings and methods described herein obviates the need to incorporate air pollution control technology into the manufacturing process. As a result, the methods and compositions described herein can minimize the time, space and money for maintenance of air pollution control systems in an operation in which a coating step is integrated.

Solvent-based coating compositions, whether organic solvent or aqueous based, require the use of heat to dry the coated surfaces and thereby force the evaporation of the solvent. Large ovens are used to accomplish this process, and it can be appreciated that there is a large cost associated with operating these ovens. Furthermore, the use of ventilation systems (for instance large fans), and air pollution control systems all require energy to operate. Therefore, the UV-curable coatings, compositions and methods described herein create significant energy savings by limiting (or eliminating) the need for large ovens, associated ventilation systems and air purification systems required for alternative thermal or solvent-based coating compositions and methods.

There is considerable benefit to having a coating composition and process which requires only a single coating step. This is cost effective in terms of the amount of coating composition used, as well as with the overall production time per item coated. Clearly, the more a part needs to be handled prior to becoming a finished product, the more costly it is to produce. The high solids content, UV-curable coating compositions described herein utilize mixtures of monomers and photoinitiators to impart desirable rheological characteristics to the composition and the resulting film which has been applied to the surface prior to exposure to UV radiation. These Theological properties include viscosity, surface wetting and thixotropic behavior, which allows the composition to be sprayed onto a surface, allows the composition to remain where it lands on the surface, and allows the composition droplets to flow together and fill in any gaps without dripping or running off the surface; thereby creating a complete, near pinhole-free film on the surface. Such control of the rheological properties of the UV-curable coating composition contributes to the ability of the coating compositions and coating procedures described herein to obtain improved coverage in a single application step. In addition, the coating composition described herein, still impart beneficial qualities, such as hardness, smoothness, slickness, impact resistance, abrasion resistance, scratch resistance, stain resistance, chemical resistance, solvent resistance, fire resistance, improved adhesion properties, high durability, flexibility, light stability, and UV stability when applied as a single coat. Optionally oligomers, and/or fillers and/or nano-fillers, and/or surfactants and/or polymerizable pigment dispersions may be incorporated into the mixture of monomers and photoinitiators to further manipulate the rheological properties of the compositions described herein.

The UV-curable coating compositions described herein can be applied to surfaces by spraying, curtain coating, dipping, rolling or brushing. However, spraying is the one of the most efficient methods of application, and this can be accomplished using High Volume Low Pressure (HVLP) methodology or electrostatic spraying technology. HVLP and electrostatic spraying techniques are methods well established in the coating industry, thus it is adventitious to develop coating compositions which utilize these application means.

In addition, the UV-curable compositions described herein may be applied using air-assisted/airless type spraying technology. Air-assisted airless pumps are usually air-operated, positive displacement, reciprocating piston pumps that siphon coating compositions directly out of a container. They require an air compressor for operating both the pump and the gun, although some systems can operate on as little as 5 cubic feet per minute (cfm) from a 1.5 HP compressor. This is about one-quarter the amount of air needed for a conversion HVLP gun, and the fluid is delivered at a significantly higher fluid pressure, 300–600 psi. The coating composition atomizes as it escapes to atmospheric pressure, and the gun then adds a little bit of air (about 2 cfm) to the ends of the spray pattern, the "air assist" of the "airless" process, which eliminates the "tails" or heavy edges, thereby minimizing overlapping lines or stripes.

The cleaning process for the surfaces of TPO objects is more environmentally friendly than processes generally used for solvent-based coating compositions. The cleaning of the surfaces of TPO objects should be gentle, with the procedure involving removal of loose impurities, surface soils, oil and grease by wiping with a clean lint-free cloth or by washing with a biodegradable cleaner, followed by a water rinse and drying. The water rinse can use deionized, purified water or tap water, with a contact time and/or water flow rate sufficient to remove substantially all of the cleaner from the surface. The waste stream from this simplified cleaning process contains less toxic and/or harmful materials than the process used for solvent-based coating compositions. The cleaning regimens used to clean surfaces prior to coating with solvent-based coating compositions generally involve contacting the surface with an alkaline-based cleaner or an acidic cleaner, typically as aqueous solutions. Examples of alkaline cleaning agents include sodium hydroxide and potassium hydroxide. In addition to the cleaning agent and water, the cleaning solution may optionally include surfactants and builders, such as soda ash, pyrophosphate, or tripolyphosphate.

The high solids content, UV-curable compositions disclosed may produce clear or opaque coatings without the use of milling and with no addition of solvent. In addition, such coatings exhibit exceptional clarity and gloss. The characteristics of the compositions are that they have near zero VOC's, near zero HAP's, cure in seconds, for example, but not limited to, 1.5 seconds, (thereby decreasing cure time by 99%), require up to 80% less floor space, require up to 80% less energy, are non-flammable, require no thinning, are extremely durable, are high gloss, applied using HVLP or electrostatic bell, do not require flash off ovens, do not require thermal cure, have no thermal stress and no orange peel effect. Further, they enable the user to decrease production time while producing a product with superior, more reproducible appearance. The user stands to save time, energy, and space, and may reduce or eliminate HAP emissions.

Also disclosed are processes and assemblages for applying sprayable, high solids content, UV curable compositions. The characteristics of the processes are that they provide an industrial strength coating, have up to 98% reclamation of overspray, no cooling line required, immediate "pack and ship," decreased parts in process, less workholders, no workholder burn off, eliminate air pollution control systems, safer for the environment, safer for employees, decreased production costs, decreased production time, and increased production.

High Solids Content, UV-Curable Compositions

The compositions described herein are essentially solvent free, and are referred to as high solids content, UV curable compositions. The compositions disclosed herein comprise UV-curable monomers and photoinitiators, and may optionally contain oligomers, nano-fillers, fillers, surfactants and solid pigment dispersions. The compositions disclosed herein are used to obtain coatings on TPO objects which exhibit enhanced adhesion properties, hardness, light and UV stability, abrasion resistance, scratch resistance, impact resistance, stain resistance, solvent resistance, chemical resistance, fire resistance high durability, flexibility, gloss and clarity. The high solids content, UV curable compositions described herein consist of, based on total composition weight; 75–98% of monomer or multiplicity of monomers, 2–10% photoinitiator or multiplicity of photoinitiators, 0–1% surfactant, 0–17% nano-filler or nano-filler mixture, 0–15% solid pigment or multiplicity of solid pigment dispersions, and 0–10% oligomer or multiplicity of oligomers. Certain embodiments may comprise up to about 1%, up to about 2%, up to about 3%, up to about 4%, up to about 5%, up to about 6%, up to about 7%, up to about 8%, up to about 9%, or up to about 10% oligomer or multiplicity of oligomers. In addition, the compositions are sprayable by HVLP, electrostatic bell, or air-assisted/airless without the addition of heat, and are curable by ultraviolet radiation.

The monomers may be selected from the group consisting of monoacrylates, diacrylates, triacrylates, urethane acrylates, ester acrylates, epoxy acrylates and mixtures thereof. The monomers may be chosen from a group consisting of tetrahydrofurfuryl acrylate, isobornyl acrylate, 1,4-butanediol dimethylacrylate, 2-phenoxyethyl acrylate, propoxylated glyceryl triacrylate, and combinations thereof. In addition, monomers may be further selected from a group consisting of, trimethylolpropane triacrylate, acrylate ester derivatives, and methacrylate ester derivatives tripropylene glycol diacrylate, and combinations thereof.

To enable spraying onto a desired surface the pre-polymerization viscosity must be controlled, and this is achieved using the low molecular weight monomers. The viscosity of the compositions described herein is from about 2 centipoise to about 500 centipoise. Certain embodiments of the compositions described herein have a viscosity of approximately 30 centipoise at room temperature, allowing coverage in one coat with application by spraying without the addition of heat using HVLP, air-assisted/airless, or electrostatic bell. Other possible methods of applying the compositions described herein include brushing, curtain coating, dipping, and rolling. However, the monomers are multifunctional by behaving as adhesion promoters, participating and contributing to the final coating properties and they do not evaporate.

The rapid polymerization reaction is initiated by a photoinitiator component of the composition when exposed to ultraviolet light. The photoinitiators used in the compositions described herein are categorized as free radicals; however, other photoinitiator types can be used. Furthermore, combinations of photoinitiators may be used which encompass different spectral properties of UV sources used to initiate polymerization. In one embodiment, the photoinitiators are matched to the spectral properties of the UV sources. It is to be appreciated that the compositions described herein may be cured by medium pressure mercury arc lights which produce intense UV-C (200–280 nm) radiation, or by doped mercury discharge lamps which produce UV-A (315–400 nm) radiation, or UV-B (280–315 nm) radiation depending on the dopant, or by combination of lamp types depending on the photoinitiator combinations used. In addition, the presence of pigments may absorb radiation both in the UV and visible light regions, thereby reducing the effectiveness of some types of photoinitator. However, phosphine oxide type photoinitiators, for example but not limited to bis acylphosphine oxide, are effective in pigmented, including, by way of example only, black, UV-curable coating materials. Phosphine oxides also find use as photoinitiators for white coatings.

Other photoinitiators which are suitable for initiating polymerization of the compositions described herein include, but are not limited to, IRGACURE® 500 (Ciba Specialty Chemicals 540 White Plains Road, Tarrytown, N.Y., U.S.A.) 1-phenyl-2-hydroxy-2-methyl-1-propanone, oligo{2-hydroxy-2 methyl-1-4-(methylvinyl)phenylpropanone)}, 2-hydroxy 2-methyl-1-phenyl propan-1 one, bis (2,6-dimethoxybenzoyl)-2,4,4-trimethylpentyl phosphine oxide, 1-hydroxycyclohexyl phenyl ketone, benzophenone, bis(N,5,2,4-cyclopentadien-1-yl)-bis 2,6-difluoro-3-(1H-pyrol-1-yl) phenyl titanium, 2-benzyl-2-N,N-dimethyl amino-1-(4-morpholinophenyl)-1-butanone, IRGACURE® 784 and IRGACURE® 369, (both from Ciba Specialty Chemicals 540 White Plains Road, Tarrytown, N.Y., U.S.A.), ESACURE® KTO-46 (Lamberti S.p.A., Gallarate (VA), Italy), ESACURE® KTO (Lamberti S.p.A., Gallarate (VA), Italy), Lucirin®TPO (BASF Corporation, New Jersey, USA), 2-methyl-1-4(methylthio)-2-morpholinopropan-1-one, 4-(2-hydroxy) phenyl-2-hydroxy-2-(methylpropyl)ketone, 1-hydroxy cyclohexyl phenyl ketone benzophenone, (cyclopentadienyl)(1-methylethyl)benzene-iron hexafluorophosphate, 2,2-dimethoxy-2-phenyl-1-acetophen-one 2,4,6-trimethyl benzoyl-diphenyl phosphine oxide, benzoic acid, 4-(dimethyl amino)-ethyl ether, diphenyl (2,4,6-trimethylbenzoyl) phosphine oxide, 2-hydroxy-2-methyl-1-phenyl-propan-1-one (DAROCUR® 1173 from Ciba Specialty Chemicals 540 White Plains Road, Tarrytown, N.Y., U.S.A.)), 2,4,6-trimethylbenzophenone, 4-methylbenzophenone, and combinations thereof.

The oligomers may be selected from the group consisting of monoacrylates, diacrylates, triacrylates, polyacrylates, urethane acrylates, polyester acrylates, polyether acrylates, epoxy acrylates and mixtures thereof. Suitable compounds which may be used in the practice of the present invention include, but are not limited to, trimethylolpropane triacrylate, alkoxylated trimethylolpropane triacrylate, such as ethoxylated or propoxylated trimethyolpropane triacrylate, 1,6-hexane diol diacrylate, isobornyl acrylate, aliphatic urethane acrylates (di-, tri-, hex-: Ebecryl 230, Ebecryl 244, Ebecryl 264, Ebecryl, 220), vinyl acrylates, epoxy acrylates, ethoxylated bisphenol A diacrylates, trifunctional acrylic ester, unsaturated cyclic diones, polyester diacrylates; epoxy diacrylate/monomer blends, aliphatic urethane triacrylate/ monomer blends, aliphatic urethane triacrylates blended with 1,6-hexanediol acrylate, hexafunctional urethane acrylates, siliconized urethane acrylates, aliphatic siliconized urethane acrylates, CN990 (Sartomer, Exton, Pa., U.S.A.), bisphenol epoxy acrylates blended with trimethylolpropane triacrylate, fatty acid modified bisphenol A acrylates, acrylated epoxy polyol blended with trimethylolpropane triacrylate, and mixtures thereof.

Pigments, are insoluble white, black, or colored material, typically suspended in a vehicle for use in a paint or ink, and may also include effect pigments such as micas, metallic pigments such as aluminum, and opalescent pigments.

Pigments are used in coatings to provide decorative and/or protective functions however, due to their insolubility, pigments may be a possible contributing factor to a variety of problems in liquid coatings and/or dry paint films. Examples of some film defects thought to be attributable to pigments include: undesirable gloss due to aggregates, blooming, pigment fading, pigment flocculation and/or settlement, separation of pigment mixtures, brittleness, moisture susceptibility, fungal growth susceptibility, and/or thermal instability.

An "ideal" dispersion consists of a homogeneous suspension of primary particles. However, inorganic pigments are often incompatible with the resin in which they are incorporated, and this generally results in the failure of the pigment to uniformly disperse. Furthermore, a milling step may be required as dry pigments comprise a mixture of primary particles, aggregates, and agglomerates which must be wetted and de-aggregated before the production of a stable, pigment dispersion is obtained.

The level of dispersion in a particular pigment-containing coating composition affects the application properties of the composition as well as the optical properties of the cured film. Improvements in dispersion have been shown to result in improvements in gloss, color strength, brightness, and gloss retention.

Treatment of the pigment particle surface to incorporate reactive functionality has improved dispersion of pigments in a coating composition. This surface treatment can be applied to both inorganic pigments and organic pigments. Examples of surface modifiers include polymers such as polystyrene, polypropylene, polyesters, styrene-methacrylic acid type copolymers, styrene-acrylic acid type copolymers, polytetrafluoroethylene, polychlorotrifluoroethylene, polyethylenetetrafluoroethylene type copolymers, polyaspartic acid, polyglutamic acid, and polyglutamic acid-y-methyl esters, and modifiers such as silane coupling agents and alcohols.

These surface-modified pigments have improved the pigment dispersion in a variety of resins, for example, olefins such as polyethylene, polypropylene, polybutadiene, and the like; vinyls such as polyvinylchloride, polyvinylesters, polystyrene; acrylic homopolymers and copolymers; phenolics; amino resins; alkyds, epoxys, siloxanes, nylons, polyurethanes, phenoxys, polycarbonates, polysulfones, polyesters (optionally chlorinated), polyethers, acetals, polyimides, and polyoxyethylenes.

Surface modification can be achieved on various inorganic pigments, for example, but not limited to, titanium dioxide, aluminum oxide, zinc oxide, zirconium oxide, iron oxides: red oxide, yellow oxide and black oxide, Ultramarine blue, Prussian blue, chromium oxide and chromium hydroxide, barium sulfate, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, clays such as kaolin clay, muscovite and sericite.

The various organic pigments in which surface modification can be achieved include, for example, carbon black, azo-pigment, phthalocyanine pigment, thioindigo pigment, anthraquinone pigment, flavanthrone pigment, indanthrene pigment, anthrapyridine pigment, pyranthrone pigment, perylene pigment, perynone pigment and quinacridone pigment.

Inorganic pigments optionally added to the compositions described herein are advantageously opacifying inorganic pigments, such as pigmentary titanium dioxide. Titanium dioxide pigments include rutile and anatase titanium. Treated inorganic pigments, and especially pigmentary titanium dioxide, find uses in powder paints and similar systems.

The solid pigment dispersions optionally used in the composition described herein may also be selected from a group consisting of the following pigments bonded with modified acrylic resins: carbon black, rutile titanium dioxide, organic red pigment, phthalo blue pigment, red oxide pigment, isoindoline yellow pigment, phthalo green pigment, quinacridone violet, carbazole violet, masstone black, light lemon yellow oxide, light organic yellow, transparent yellow oxide, diarylide orange, quinacridone red, organic scarlet, light organic red, and deep organic red. These polymerizable pigment dispersions are distinguishable from other pigment dispersions which disperse insoluble pigment particles in some type of resin and entrap the pigment particles within a polymerized matrix. The pigment dispersions used in the compositions and methods described herein have pigments treated such that they are attached to acrylic resins; consequently the pigment dispersion is polymerizable upon exposure to UV irradiation and becomes an integral in the cure coating and in the overall coating properties.

Inorganic pigments, as used herein, refers to ingredients which are particulate and substantially nonvolatile in use, and includes those ingredients typically labeled as inerts, extenders, fillers or the like in the paint and plastic trade.

The particle size of fillers can vary from micron-sized particles to nanometer-sized particles. Typically, when used as fillers the average particle size of inorganic pigments is 1–2 microns, which imparts certain Theological properties to the composition, such as viscosity. Polymer nanocomposites are the blend of nanometer-sized fillers with either a thermoset or UV-curable polymers. Polymer nanocomposites have improved properties compared to conventional filler materials, as the addition of nanoscale fillers to polymers can have a dramatic effect on the coating mechanical properties compared to micron scale fillers. These improved properties include improved tensile strength, modulus, heat distortion temperature, barrier properties, UV resistance, abrasion and scratch resistance, and conductivity. These improved properties may be in large part due to the small size and large surface area of the nanoscale fillers. Clear, scratch-resistant coatings are needed in a variety of products, including fingernail polishes, flooring, plastic glazing, headlamp covers and other automotive parts, transportation windows and optical lenses. The incorporation of certain nano-fillers, such as nano-alumina, can provide long-term abrasion resistant coatings without significantly effecting optical clarity, gloss, color or physical properties.

Nano-fillers can be either insoluble inorganic nanometer sized particles, or insoluble organic nanometer sized particles. The inorganic nano-fillers are generally metal oxides, although other inorganic compounds can be used. Examples of inorganic nano-fillers include aluminum nitrides, aluminum oxides, antimony oxides, barium sulfates, bismuth oxides, cadmium selenides, cadmium sulfides, calcium sulfates, cerium oxides, chromium oxides, copper oxides, indium tin oxides, iron oxides, lead chromates, nickel titanates, niobium oxides, rare earth oxides, silicas, silicon dioxides, silver oxides, tin oxides, titanium dioxides, zinc chromates, zinc oxides, zinc sulfides, zirconium dioxides, and zirconium oxides. Alternatively, organic nano-fillers are generally polymeric materials ground into nanometer sized particulates. Examples of organic nano-fillers include nano-polytetrafluoroethylene.

Nano-alumina is composed of high purity aluminum oxide approximately 10–40 nanometer discrete spherical particles. Nano-alumina-based compositions find use in abrasion resistant coating applications requiring superior optical transparency such as eye glasses; fine polishing applications, including semiconductors; and nanocomposite applications, including improved thermal management. In addition, incorporation of nano-alumina into coating compositions can results in extremely hard coatings, which may find use in coating objects which may need impact resistance. Furthermore, the incorporation of nano-alumina into coating systems may also maintain excellent optical clarity, gloss and physical properties of the coatings.

Nano-silica and nano-silicon dioxides, with an average particle size 5 to 50 nm, can be incorporated into coating compositions with up to 40–65% silica content with little increase in composition viscosity and no loss in coating clarity. In addition, the resulting coating also has improved toughness, hardness and abrasion resistance.

Other materials having properties such as, but not limited to, wear resistance, hardness, stiffness, abrasion resistance, IN resistance and corrosion resistance which may be used as nano-fillers include: oxides, carbides, nitrides, borides, silicates, ferrites and titanates. For instance, examples of such nano-fillers are, but not limited to, nano-zirconium oxide, nano-zirconium dioxides, nano-silicon carbide, nano-silicon nitride, nano-sialon (silicon aluminum oxynitride), nano-aluminum nitrides, nano-bismuth oxides, nano-cerium oxides, nano-copper oxides, nano-iron oxides, nano-nickel titanates, nano-niobium oxides, nano-rare earth oxides, nano-silver oxides, nano-tin oxides, and nano-titanium oxides. In addition to these properties, these materials have relatively high mechanical strength at high temperatures.

UV absorbers may be incorporated into the coating compositions described herein to further add to the UV resistance properties already imparted by the use of nano-fillers in the coating compositions described herein. The TV absorbers which may be incorporated into composition described herein include, but are not limited to, hindered amine light stabilizers and the Tinuvin® products from Ciba® Specialty Chemicals, Basel, Switzerland, such as 2-hydroxyphenyltriazine (Tinuvin® 400). Note that Tinuvin® 400 is flammable and should be used with the necessary safety precautions.

The surfactants incorporated into composition described herein include, but are not limited to, Tego Rad 2100 (Tego Division of Degussa Corporation), Tego Rad 2500 (Tego Division of Degussa Corporation), Dabco DC 5103 (Air Products), and combinations thereof.

Slip indicates the ease with which two contacting surfaces can move by each other. Coatings are said to have good slip when they have a low coefficient of friction and poor slip when they have a high coefficient of friction. Coated surfaces which are tack-free and behave as if they are lubricated have good slip characteristics, allowing coated materials to slide by one another. Slip is an important characteristic of coated objects, particularly objects which benefit from minimal friction such as, but not limited to, hydraulic rods, hydraulic cylinders, wheel bearings and shock absorbers. In addition, manufacturing processes such as, but not limited to, forming operations, filling, handling and shipping, may also benefit from the use of coated objects with good slip properties. To provide good substrate wetting and slip with no migration properties to the coated surface it is desirable to incorporate some type of slip and flow enhancer, also referred herein as a slip and flow improver, into the composition. Slip and flow enhancers reduce the friction coefficient and surface tension, thereby facilitating spreading of coating compositions and improving slip characteristics of cured coatings. Slip and flow enhancers may be waxes, polymeric compounds, monomers, inorganic compounds, or organic compounds. Examples of slip and flow enhancers are, but not limited to, various waxes, silicones, modified polyesters, acrylated silicone, molybdenum disulfide, tungsten disulfide, EBECRYL (350 (UCB Surface Specialties, Brussels, Belgium), EBECRYL® 1360 (UCB Surface Specialties, Brussels, Belgium), and CN990 (Sartomer, Exton, Pa., U.S.A.), polytetrafluoroethylene, a combination of polyethylene wax and polytetrafluoroethylene, dispersion of low molecular weight polyethylene or polymeric wax, silicone oils, and the like. Slip and flow enhancers typically comprise less than 20% by weight of a coating composition. When slip and flow enhancers are incorporated as minor components into coating compositions, they are referred to as additives, and typically, by way of example only, comprise less than 5% by weight of a coating composition. Alternatively, slip and flow enhancers may be a significant proportion of the formulation, and may be referred to as slip and flow enhancing oligomers as they are an integral component of the resulting coating. Typically, by way of example only, slip and flow enhancing oligomers comprise greater than 10%, of a coating composition. An example of such a slip and flow enhancing oligomer is CN990 (Sartomer, Exton, Pa., U.S.A.). The compositions described herein may incorporate slip and flow enhancers, as additives or slip and flow enhancing monomers, and optionally nano-fillers to obtain cured coatings with enhanced slip properties.

The compositions described herein may be used to impart hardness, abrasion resistant, scratch resistant, chemical resistant, stain resistant, fire resistant, solvent resistant, impact resistant coatings on TPO objects, which exhibit improved adhesion properties, slip properties, durability, flexibility, light stability, UV stability, and combinations thereof. Examples of such objects or articles of manufacture which can coated using the compositions present herein include, but are not limited to motor-vehicle parts/accessories such as, but not limited to, front and rear bumpers, bumper valances, door cladding, stone guards, wheel moldings, airbag assembly inserts and covers, bumper fascias, bumper filler strips, exterior grilles, interior door and dash panels, and body side claddings; sporting and recreational goods; toys; casings/skins for electronic products; packaging for food; packaging for chemical products; business machines; laboratory and medical equipment; household products; and other consumer products. Other objects or articles of manufacture which can be coated using the compositions present herein include, but are not limited, single-ply roofing membranes, pipe boots and pre-fabricated accessories. In addition, the compositions present herein may be used to coat objects or articles of manufacture which have a variety of shapes including, but not limited to, round, flat, oblong, angular, curved, recessed, and sloped.

Use of 100% Solids, UV-Curable Coating Compositions

The compositions described herein are a significant improvement as they do not contain any water or organic solvent which must be removed before complete curing is achieved. Removal of the solvent from reduces HAP emissions, and therefore the compositions described herein are much less hazardous to users/workers and the environment. In addition, such compositions are economical as they can be applied in a single coat, and require less space, less energy and less time to apply, cure, and dry. Thus, use of the compositions and methods described herein, to coat various products comprising TPO (which may optionally be unprimed) decreases coating time, and therefore increases production. Additionally, the compositions described herein yield hard, abrasion resistant, scratch resistant, chemical resistant, stain resistant, fire resistant, solvent resistant, impact resistant, coatings on TPO objects, which exhibit improved adhesion properties, slip properties, durability, flexibility, light stability, UV stability, and combinations thereof.

FIG. 1 is a flowchart of one possible process used to obtain coated thermoplastic olefin objects (which may optionally be unprimed) in which the coatings exhibit hardness, abrasion resistance, scratch resistance, chemical resistance, stain resistance, fire resistance, solvent resistance, impact resistance, which exhibit improved adhesion properties, slip properties, durability, flexibility, light stability, UV stability, and combinations thereof. Initially the composition for the desired coating properties is chosen, and the objects are either optionally cleaned prior to coating, or are directly coated, with the chosen coating composition. The coated object is then cured by UV light and is then optionally packed and shipped for consumer use, industrial use, scientific use, or any other use contemplated by the end user.

To obtain clear or opaque coatings using the compositions described herein, the composition components are generally mixed together in a mixing vessel using, by way of example only, a sawtooth blade or a helical mixer. The components of the composition are mixed at sufficient shear until a smooth, homogeneous coating mixture is obtained. In addition, mixing can be achieved by shaking, stirring, rocking, or agitating. The desired compositions are prepared to specifications, such as, but not limited to, clarity, opacity, color, scratch resistance, abrasion resistance, chemical resistance, stain resistance, fire resistance, solvent resistance, impact resistance, slip, hardness, adhesion and gloss. In addition, the coating contains a combination of monomers and photoinitiators, with optional oligomers, nano-fillers, fillers, polymerizable pigment dispersions, and/or surfactants, such that necessary specifications are obtained.

Figure 2:
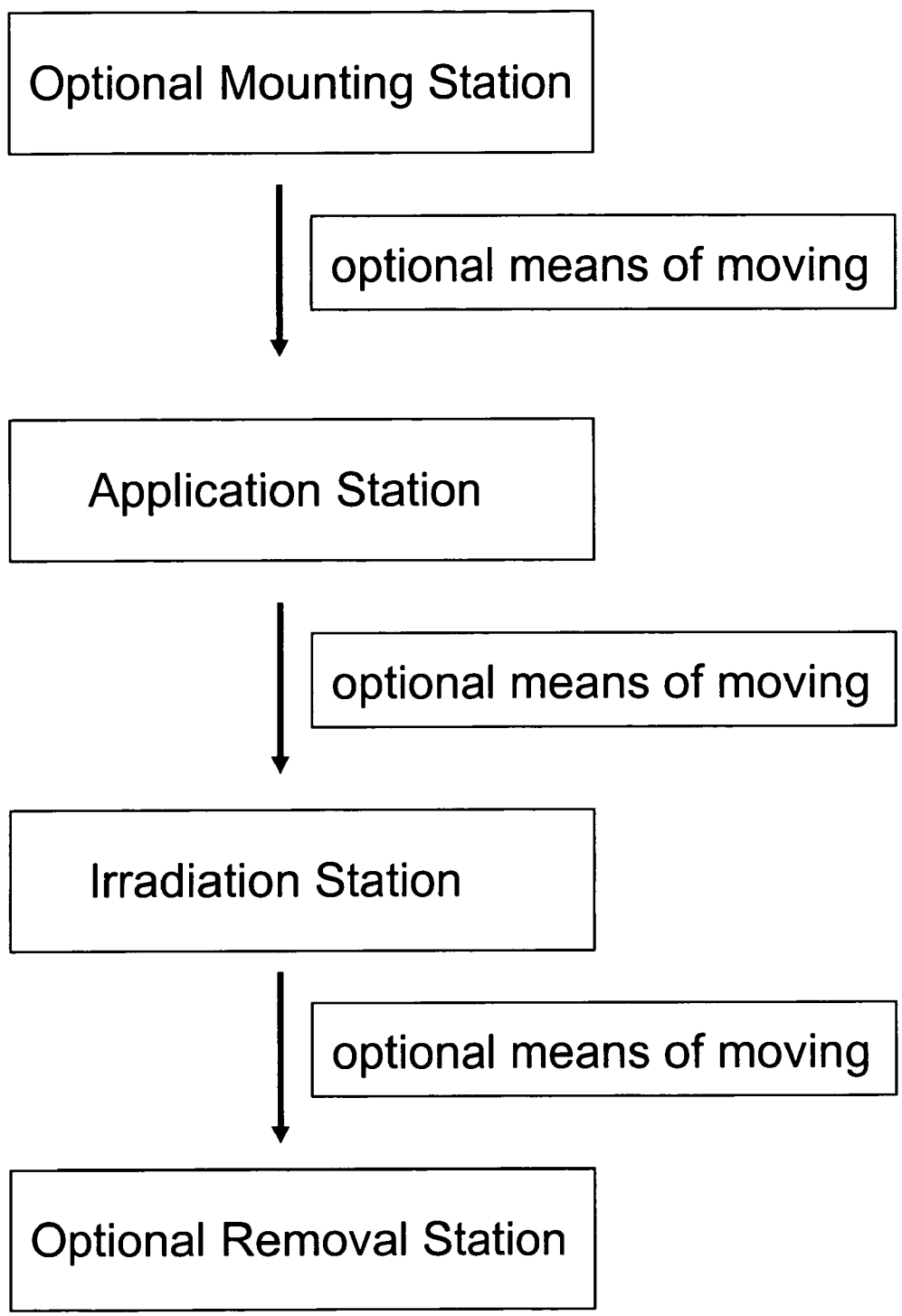
FIG. 2 is a schematic of one possible assemblage for coating thermoplastic olefin objects with coating compositions described herein.

FIG. 2 is a schematic of one possible assemblage of processes used for coating objects with the UV-curable coating compositions described herein. The first stage of the assemblage is an optional mounting station, in which the object to be coated is attached to a movable unit, by way of example only, a spindle, a hook, or a baseplate. The object can be attached using, by way of example only, nails, screws, bolts and nuts, tape, glue, or any combination thereof. In addition, human workers can perform the task of attachment, or alternatively, robots can be used to do the same function. Next, the mounted object is translated by an optional means for moving to an Application Station. The optional means for moving can be achieved, by way of example only, conveyer belts, rails, tracks, chains, containers, bins, carts, and combinations thereof. In addition, the means for moving can be mounted on a wall, or a floor, or a ceiling, or any combination thereof. The Application Station is the location at which the desired object is coated with the necessary coating composition. The means for applying the coating composition is located at the Application Station. The means for applying the coating composition includes, by way of example only, high pressure low volume spraying (HVLP) equipment, electrostatic spraying equipment, air-assisted/airless spraying equipment, brushing, rolling, dipping, blade coating, curtain coating or a combination thereof. The multiple means for applying the coating composition can be incorporated and arranged at the Application Station whereby it is ensured that top, bottom and side coverage of the object occurs. In addition, the mounted object is optionally rotated, on at least one axis, prior to and during the application of the coating composition to ensure uniform coverage. In addition, if desired masks or templates may be included in order to incorporate a design, logo, or the like onto the object. The Application Station may include multiple types of coatings, including different coating colors, as may be desired. When application of the coating composition is complete, the mounted coated object may continue to rotate, or may cease rotating. The Application Station may also include an optional reclamation system to reclaim any oversprayed coating composition, and whereby reclaim at least 98% of oversprayed coating composition. This composition recycling system allows for significant savings in the use and production of coating compositions, as the reclaimed composition can be applied to different objects in the process line.

The mounted coated object may now be translated from the Application Station, by the optional means for moving, to the Irradiation Station (also referred to herein as a curing chamber), wherein curing of the coated object occurs. The Irradiation Station is located further along the production line at a separate location from the Application Station. In one embodiment the Irradiation Station has a means for limiting exposure of actinic radiation to other portions of the assemblage. Multiple means are envisioned, including, but not limited to, doors, curtains, shields, and tunnels which incorporate angular or curved paths along the production line. The means for limiting exposure of actinic radiation of the Irradiation Station are used, such as, by way of example only, either closing doors, placement of shields, or closing curtains, to protect operators from exposure to UV radiation, and to shield the Application Station to ensure that no curing occurs there. Inside the Irradiation Station there are three sets of UV lamps arranged to ensure top, bottom and side exposure to the UV radiation. In addition each UV lamp set contains two separate lamp types; by way of example only, one mercury arc lamp and one mercury arc lamp doped with iron, to ensure proper three dimensional curing. Thus, there are actually six lamps within the Irradiation Station. Alternatively, this three dimensional curing can be achieved by using only two lamps, by way of example only, one mercury arc lamp and one mercury arc lamp doped with iron, with a mirror assembly arranged to ensure exposure to the UV radiation and curing of the top, bottom and sides of the coated object. Regardless of the specific approach used, location of the two lamp types within the Irradiation Station is adventitious as it does not require transport of the coated object to separate locations for partial curing and then complete curing.

In one embodiment, after translation of the mounted coated object inside the Irradiation Station, the doors close and the mounted coated object is again optionally rotated. The longer wavelength lamps, by way of example only, mercury arc lamp doped with iron, are activated for the partial curing stage, and then the shorter wavelength lamps, by way of example only, mercury arc lamp, are activated for the full cure stage. The longer wavelength lamps do not need to be completely off before the shorter wavelength lamps are turned on. Following the two curing stages, all lamps are turned off, the doors on the other side of the Irradiation Station are opened (if doors are installed on the Irradiation Station, otherwise object is otherwise provided an exit from the Irradiation Station) and the fully cured mounted object is translated, using the optional means for moving, to an optional Removal Station. At the optional Removal Station coated, fully cured object may be removed from the mounting and, either moved to a storage facility, using the optional means for moving, or immediately packed and shipped, without the need to wait for parts to cool or for solvent emissions to dissipate. In addition, human workers can perform the task of removal, or alternatively, robots can be used to do the same function. No cooling is required prior to removal, as no heat is required for the application or curing steps, with all steps occurring at ambient temperature.

Figure 3:
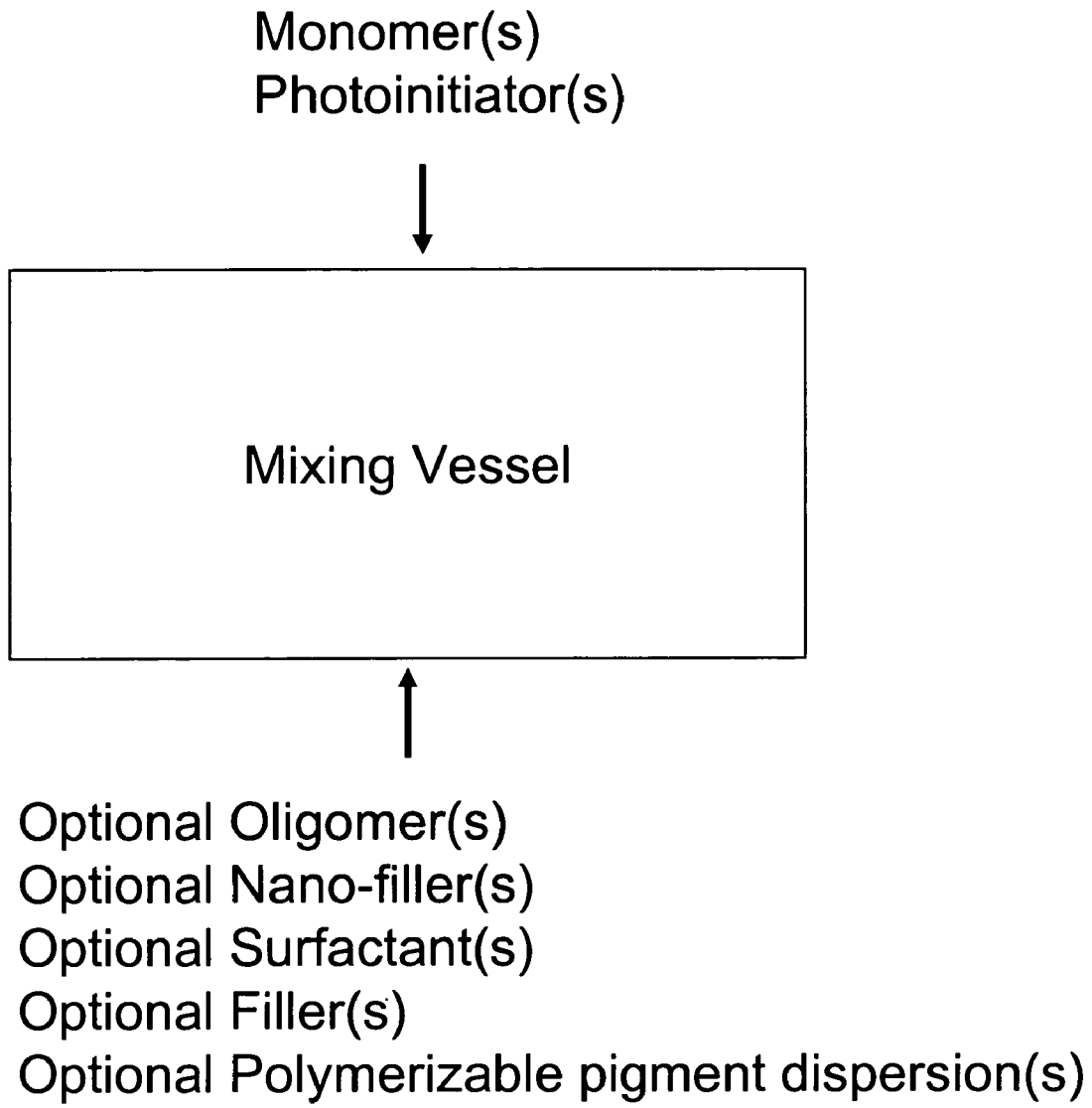
FIG. 3 is an illustration of one possible combination of components in coating compositions described herein.

FIG. 3 depicts is an illustration of the exemplary components of clear, hard, abrasion resistant, scratch resistant, and impact resistant UV-curable coating compositions described herein. Generally the components are mixed together in a mixing vessel using, by way of example only, a sawtooth blade or a helical mixer. The components of the composition are mixed at sufficient shear until a smooth, homogeneous coating mixture is obtained. In addition, mixing can be achieved by shaking, stirring, rocking, or agitating. The desired compositions are prepared to specification, such as, but not limited to, enhanced hardness, abrasion resistance, scratch resistance, impact resistance and gloss.

Figure 4:
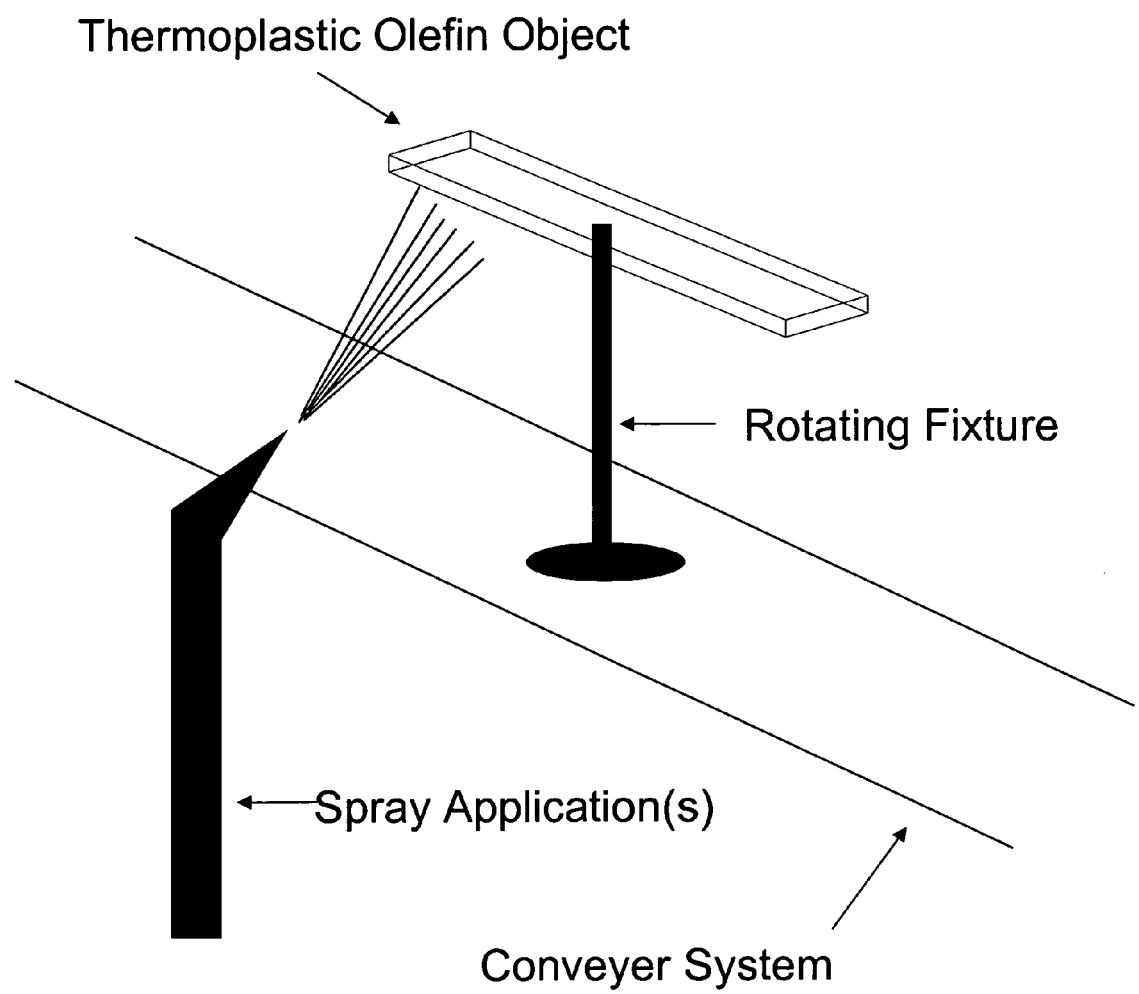
FIG. 4 is an illustration of one method by which coatings described herein are applied.
Figure 5:
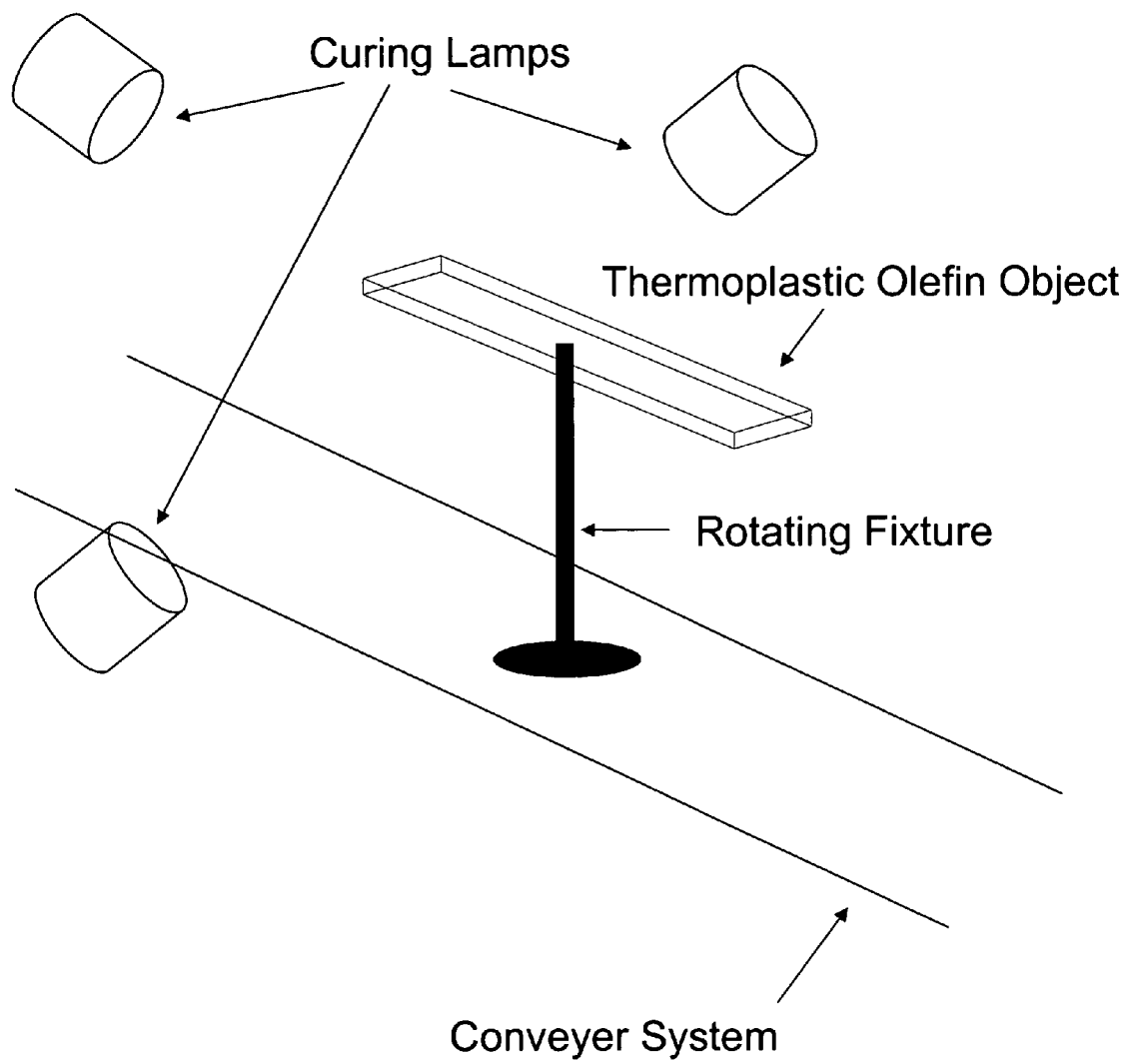
FIG. 5 is an illustration of one method for curing coatings obtained from coating compositions described herein.

Next, as shown in FIG. 4, the compositions are applied to the surface of thermoplastic olefin objects (which may optionally be unprimed), or the surface of objects comprising thermoplastic olefin (which may optionally be unprimed), by an application means, including, but not limited to HVLP, air-assisted/airless, or electrostatic bell. FIG. 4 shows one possible arrangement of spray heads used for coating, although other techniques can be used such as dipping, flow, or curtain coating. As shown in FIG. 4, the thermoplastic olefin object is affixed to a rotating fixture, and this combination is attached to a conveyer system for transport from the coating application area to the curing area. The resulting coating film is then cured, as shown FIG. 5, by using either a single UV light source, or a combination of light sources which emit spectral frequencies that overlap the required wavelengths needed to excite the specific photoinitiators used in the compositions. FIG. 5 indicates the one possible UV lamp arrangement for complete three dimensional curing. The compositions described herein may be applied in a single application, or in multiple applications, wherein multiple applications may involve a series of coating and curing steps. Finally, after curing is complete, the coated surface is ready for immediate handling and shipping, without the need to wait for parts to cool or for solvent emissions to dissipate.

In embodiments which incorporate polymerizable pigment dispersions into the compositions described herein, the frequencies of light used to cure such compositions are chosen to ensure full curing of the resulting coatings by penetrating the opaque compositions to reach the base substrate for a complete through cure. Such coatings are cured by exposure to ultra-violet light, instead of heat. Since this curing process is almost instantaneous, requiring (for example) an average of 1.5 seconds per light (FIG. 5), both time and energy are conserved. Coating compositions are prepared using a mixture of photoinitiators sufficient to encompass all necessary frequencies of light. Curing lights, or light pairs, may be high pressure mercury lamps, mercury lamps doped with gallium or iron, or in combination as required. Lamps may be powered by direct application of voltage, by microwaves, or by radio-waves. In addition, the curing lights, or light pairs are arranged to ensure complete curing of objects. Such arrangements include, but are not limited to, a three dimensional arrangement.

Polymerization, in particular acrylate double bond conversion and induction period, may be affected by the choice of monomers, photoinitiators, nano-fillers, fillers, and pigment dispersions, as well as UV lamp irradiance and spectral output. In comparison to clear coat formulations, the presence of pigments may make curing much more complex due to the absorption of the UV radiation by the pigment. Thus, the use of variable wavelength UV sources, along with matching of absorption characteristics of photoinitiators with UV source spectral output, allows for curing of pigmented formulations.

Light sources used for UV curing include arc lamps, such as carbon arc lamps, xenon arc lamps, mercury vapor lamps, tungsten halide lamps, lasers, the sun, sunlamps, and fluorescent lamps with ultra-violet light emitting phosphors. Medium pressure mercury and high pressure xenon lamps have various emission lines at wavelengths which are absorbed by most commercially available photoinitiators. In addition, mercury arc lamps can be doped with iron or gallium. Alternatively, lasers are monochromatic (single wavelength) and can be used to excite photoinitiators which absorb at wavelengths that are too weak or not available when using arc lamps. For instance, medium pressure mercury arc lamps have intense emission lines at 254 nm, 265 nm, 295 nm, 301 nm, 313 nm, 366 nm, 405/408 nm, 436 nm, 546 nm, and 577/579 nm. Therefore, a photoinitiator with an absorbance maximum at 350 nm may not be a efficiently excited using a medium pressure mercury arc lamp, but could be efficiently initiated using a 355 nm Nd:YVO4 (Vanadate) solid-state lasers. Commercial UV/Visible light sources with varied spectral output in the range of 250–450 nm may be used directly for curing purposes; however wavelength selection can be achieved with the use of optical bandpass or longpass filters. Therefore, as described herein, the user can take advantage of the optimal photoinitiator absorbance characteristics.

Regardless of the light source, the emission spectra of the lamp must overlap the absorbance spectrum of the photoinitiator. Two aspects of the photoinitator absorbance spectrum need to be considered. The wavelength absorbed and the strength of absorption (molar extinction coefficient). For example, the photoinitiators 2-hydroxy-2-methyl-1-phenyl-propan-1-one and diphenyl(2,4,6-trimethylbenzoyl) phosphine oxide in DAROCUR®(4265 (from Ciba Specialty Chemicals 540 White Plains Road, Tarrytown, N.Y., U.S.A.) have absorbance peaks at 270–290 nm and 360–380 nm, while MMMP in IRGACURE® 907 (from Ciba Specialty Chemicals 540 White Plains Road, Tarrytown, N.Y., U.S.A.) absorbs at 350 nm and IRGACURE® 500 (which is a blend of IRGACURE® 184 (from Ciba Specialty Chemicals 540 White Plains Road, Tarrytown, N.Y., U.S.A.) and benzophenone) absorbs between 300 nm and 450 nm.

The addition of pigment to a formulation increases the opacity of the resulting coating and can affect any through curing abilities. Furthermore, the added pigment can absorb the incident curing radiation and thereby affect the performance of the photoinitiator. Thus, the curing properties of opaque pigmented coatings can depend on the pigment present, individual formulation, irradiation conditions, and substrate reflection. Therefore consideration of the respective UV/V is absorbance characteristics of the pigment and the photoinitiator can be used to optimize UV curing of pigmented coatings. Generally, photoinitiators used for curing pigmented formulations have a higher molar extinction coefficient between the longer wavelengths (300 nm–450 nm) than those used for curing clear formulations. Although, the presence of pigments can absorb radiation both in the UV and visible light regions, thereby reducing absorption suitable for radiation curing, phosphine oxide type photoinitiators, for example but not limited to bis acylphosphine oxide, are effective in pigmented, including, by way of example only, black, UV-curable coating materials. Phosphine oxides also find use as photoinitiators for white coatings, and enable an effective through cure for the highly pigmented compositions described herein.

The mercury gas discharge lamp is the UV source most widely used for curing, as it is a very efficient lamp with intense lines UV-C (200–280 nm) radiation, however it has spectral emission lines in the UV-A (315–400 nm) and in the UV-B (280–513 nm) regions. The mercury pressure strongly affects the spectral efficiency of this lamp in the UV-A, UV-B and UV-C regions. Furthermore, by adding small amounts (doping) of silver, gallium, indium, lead, antimony, bismuth, manganese, iron, cobalt and/or nickel to the mercury as metal iodides or bromides, the mercury spectrum can be strongly changed mainly in the UV-A, but also in the UV-B and UV-C regions. Doped gallium gives intensive lines at 403 and 417 nm; whereas doping with iron raises the spectral radiant power in the UV-A region of 358–388 nm by a factor of 2, while because of the presence of iodides UV-B and UV-C radiation are decreased by a factor of 3 to 7. As discussed above, the presence of pigments in a coating formulation can absorb incident radiation and thereby affect the excitation of the photoinitiator. Thus, it is desirable to tailor the UV source used with the pigment dispersions and the photoinitiator, photoinitiator mixture or photoinitiator/co-initiator mixture used. For instance, by way of example only, an iron doped mercury arc lamp (emission 358–388 nm) is ideal for use with photoinitiator IRGACURE® (500 (absorbance between 300 and 450 nm).

Multiple lamps with a different spectral characteristics, or sufficiently different in that there is some spectral overlap, can be used to excite mixtures of photoinitiator or mixtures of photoinitatiors and co-initiators. For instance, by way of example only, the use of a iron doped mercury arc lamp (emission 358–388 nm) in combination with a pure mercury arc lamp (emission 200–280 nm). The order in which the excitation sources are applied can be adventitiously used to obtain enhanced coating characteristic, such as, by way of example only, smoothness, shine, slip, hardness, adhesion, abrasion resistance and scratch resistance. Initial exposure of the coated surface with the longer wavelength source is beneficial, as it traps the filler particle in place and initiates polymerization near the surface, thereby imparting a smooth and adherent coating. Following this with exposure to the higher energy, shorter wavelength radiation enables for a fast cure of the remaining film that has been set in place by the initial polymerization stage.

The time of exposure to each lamp type can be manipulated to enhance the curing of the compositions described herein. One approach used for curing of the compositions described herein, is to expose the coated objects to the longer wavelength doped mercury arc lamps for a shorter time than exposure to the shorter wavelength mercury arc lamp. However, this exposure scheme may cause the cured coatings to wrinkle/crinkle. Therefore, other exposure schemes involve identical exposure time for both the short wavelength mercury arc lamp, and the longer wavelength doped mercury arc lamps, or alternatively the exposure time to the longer wavelength doped mercury arc lamp can be longer than the time of exposure for the short wavelength mercury arc lamps.

Testing Coated Surfaces

The coatings obtained from the high solids content, UV-curable coating compositions described herein have excellent durability and may be particularly suitable for surfaces which encounter physical wearing or exposure to various weather conditions. The mechanical properties of solid coatings and the various testing methods for them is described in "Mechanical Properties of Solid Coatings" Encyclopedia of Analytical Chemistry, John Wiley & Sons, 2000, which is herein incorporated by reference in its entirety. The coatings, compositions and methods described herein meet and exceed the requirements for at least one of the described tests, in some instances more than one of these tests, and in other instances all these tests. The descriptions for the following tests are provided by way of example only.

For example, the compositions and methods described herein provide an improved cured coating that exhibits improvement in at least one of the following tests: hardness, scrub resistance, impact resistance, abrasion resistance, scratch resistance, stain resistance, chemical resistance, solvent resistance, fire resistance, higher gloss, adhesion to substrates, slip properties, high exterior durability, gloss retention, flexibility, light stability, and UV stability, Scrub resistance testing is an accelerated procedure for determining the resistance of paints to erosion caused by rubbing. Although scrub resistance tests are intended primarily for interior coatings, they are sometimes used with exterior coatings as an additional measure of film performance. In a typical scrub test, the coating is applied to a Scrub Test Panel at a specified film thickness, cured, and then subjected to scrubbing with a straight-line scrub tester. The scrub resistance is the number of scrub cycles required to remove the coating to a specified end point. Alternatively, the loss in weight is determined after a specified number of scrub cycles as a measure of scrub resistance, with calculation of equivalent loss in film thickness.

Impact resistance is a traditional method for evaluating the impact strength or toughness of a coating to a falling object. The test can use a single object (dart) shape at a single drop height, while varying the weight of the dart. The dart size and the drop height are chosen depending upon the expected impact strength of the test sample. A number of test samples are impacted to determine an appropriate starting point for the weight of the dart. The test specimen is clamped securely in a pneumatic ring at the base of the drop tower. The mounting bracket is adjusted to the appropriate drop height, and the dart is inserted into the bracket. The dart is released and dropped onto the center of the test specimen. A series of 20 to 25 impacts are conducted, and if a test specimen passes, the drop weight is increased by one unit. If a test specimen fails, the drop weight is decreased by one unit. Alternatively, panels are tested using progressively increasing drop heights in order to determine the minimum drop height that gives rise to any cracking or peeling from the substrate. The results from these impacts are used to calculate the Impact Failure Weight—the point at which 50% of the test specimens will fail under the impact. Typically the dart is a rounded object with a diameter ranging from 38 mm (1.5 inches) to 51 mm (2 inches) and is dropped from about 0.66 meters (26 inches) 1.5 meters (60 inches).

For coatings to perform satisfactorily, they must adhere to the substrates on which they are applied. A variety of methods can be used to determine how well a coating is adheres to a surface. Commonly used evaluation techniques are performed using a knife or a pull-off adhesion tester. The knife test is a simple test requiring the use of a utility knife to pick at the coating. It establishes whether the adhesion of a coating to a substrate, or to another coating (in multi-coat systems), is at a generally adequate level. Performance is based on both the degree of difficulty to remove the coating from the substrate and the size of removed coating. Alternatively, an "X" is cut into the coating down to the surface, using the knife and cutting guide, by making two cuts at a 30–45 degree angle which intersects to form the "X" shape. At the vertex, the point of the knife is used to attempt to lift up the coating from the substrate or from the coating below.

A more formal version of the knife test is the tape test, which can be conducted with or without humidity. Incorporation of humidity to the tape adhesion/peel back test determines how the adhesive properties of the coating behave under conditions in which corrosion may occur. Pressure sensitive tape is applied and removed over cuts made in the coating. There are two variants of this test; the X-cut tape test and the cross hatch tape test. The X-cut tape test uses a sharp razor blade, scalpel, knife or other cutting device, to make two cuts into the coating down to the substrate with a 30–45 degree angle which intersects to form an "X." A straightedge is used to ensure straight cuts are made. Tape is placed on the center of the intersection of the cuts and then removed rapidly. The X-cut area is then inspected for removal of coating from the substrate or previous coating and rated. Alternatively, the cross hatch tape test is primarily intended for testing coatings less than 5 mils (125 microns) thick. It uses a cross-hatch pattern rather than the X pattern. The cross-hatch pattern is obtained by using a cutting guide or a special cross-hatch cutter with multiple preset blades to make sure the incisions are properly spaced and parallel. Tape is then applied and pulled off; the cut area is then inspected and rated. In certain embodiments the coating compositions described herein yield coatings with up to about 90% adhesion as found using the cross-hatch test. In certain embodiments the coating compositions described herein yield coatings with up to about 95% adhesion as found using the cross-hatch test. In certain embodiments the coating compositions described herein yield coatings with up to about 99% adhesion as found using the cross-hatch test. In certain embodiments the coating compositions described herein yield coatings with 99+% adhesion as found using the cross-hatch test.

A more quantitative test for adhesion is the pull-off test where a loading fixture, commonly called a dolly or stub, is affixed by an adhesive to a coating. By use of a portable pull-off adhesion tester, a load is increasingly applied to the surface until the dolly is pulled off. The force required to pull the dolly off, or the force the dolly withstood, yields the tensile strength in pounds per square inch (psi) or mega Pascals (MPa). Failure will occur along the weakest plane within the system comprised of the dolly, adhesive, coating system, and substrate, and will be exposed by the fracture surface. This test method maximizes tensile stress as compared to the shear stress applied by other methods, such as scrape or knife adhesion, and results may not be comparable. The scrape test is typically limited to testing on smooth, flat surfaces. Adhesion is determined by pushing the coated surfaces beneath a rounded stylus or loop that is loaded in increasing amounts until the coating is removed from the substrate surface.

Adhesion is also a measurable result of some hardness tests made by pencil hardness, gravelometer, impact (falling object, etc.) or mandrel bend as indicated by chipping off of the coating. Finally, loss of adhesion can be noted during some chemical resistance tests where the coating blisters, bubbles up or even falls off.

Evaluation of coated surfaces using procedures that involve continual exposure to moisture may not emulate realistic conditions experienced by the coated surface, which in reality will experience periods of wet and dry environments. Therefore evaluation of a coating using wet/dry cycles is a more realistic evaluation for daily use of a coating.

Resistance to chipping testing is primarily used to simulate the effects of the impact of flying debris on the coating of a surface. Typically a Gravelometer, which has been designed to evaluate the resistance of surface coatings (paint, clear coats, metallic plating, etc.) to chipping caused by the impacts of gravel or other flying objects. In general, the test sample is mounted in the back of the Gravelometer, and air pressure is used to hurl approximately 300 pieces of gravel, hexagonal metal nuts, or other angled objects at the test panel. The test sample is then removed, gently wiped with a clean cloth, and then tape is applied to the entire tested surface. Removal of the tape then pulls off any loose fragments of the coating. The appearance of the tested sample is then compared to standards to determine the chipping ratings, or visual examination can also be used. Chipping ratings consist of a number which designates the number of chips observed.

A "cure" test is used to evaluate completeness of curing, the coating adhesion strength to the surface, and solvent resistance. The procedure used is to take a test panel, coat it with the test sample and then cure according using the cure method of choice, such as actinic radiation. The coated and cured test panel is then subject to rubbing to evaluate the number of rubs needed to expose the surface. Failure normally is determined by a breakthrough to the substrate surface. Generally, the cloth used to rub the surface is also soaked in an organic solvent such as methyl ethyl ketone (MEK) as a means to accelerate testing conditions and test for stability to solvent exposure. One rub is considered to be one back and forth cycle, and highly solvent resistant coating achieve a rating of more than 100 double rubs. In addition, a secondary reading for the cure test may also be obtained by determining at what point a marring of the surface occurs.

For evaluation of the heat resistance of a coating, a coated TPO test panel is placed in an oven and evaluated for loss of adhesion, cracking, crazing, fading, hazing, or fogging after various periods of thermal exposure. The types of ovens used include, but are not limited to, convection ovens. The UV-curable coatings described herein may meet or exceed requirements for heat resistance with no loss of adhesion and no cracking, crazing, fading, hazing, or fogging after at least 1 hour held at, at least 110° C., and at least 10 hrs held at, at least 110° C.

Thermal shock testing is the most strenuous temperature test, designed to show how the product will perform as it expands and contracts under extreme conditions. Thermal shock testing creates an environment that will show in a short period of time how a coating would behave under adverse conditions throughout years of change. Several variants of testing include the resiliency of a coating to rapidly changing temperatures, such as that experienced in winter when moving from a warm environment, such as a house, garage or warehouse, into the freezing, cold environment outside, or vice versa. Such thermal shock tests have a rapid thermal ramp rate (30° C. per minute) and can be either air-to-air or liquid-to-liquid shock tests. Thermal Shock Testing is at the more severe end on the scale of temperature tests and is used for testing coatings, packaging, aircraft parts, military hardware or electronics destined to rugged duty. Most test items undergo air-to-air thermal shock testing where the test product moves from one extreme atmospheric temperature to another via mechanical means. Fully enclosed thermal shock test chambers can be used to avoid unintended exposure to ambient temperature, whereby minimizing the thermal shock. In Thermal Shock testing the cold zone of the chamber can be maintained at −45° C. and the hot zone can be set for 110° C. The test panels is held at each stage for at least an hour and then moved back and forth between stages in a large number of cycles. The number of Thermal Shock cycles can vary from 10 or 20 cycles, up to 1500 cycles. The UV-curable coatings described herein may meet and exceed the Thermal Shock testing requirement in which no loss of adhesion, cracking, crazing, fading, hazing, or fogging is observed for up to 20 cycles.

Scratch resistance testing is a comprehensive method of quantifying the adhesion properties of a wide range of coatings. The technique involves generating a controlled scratch with a diamond tip on the sample under test. The tip, either a diamond or a sharp metal tip, is drawn across the coated surface under either a constant or progressive load. At a certain critical load the coating will start to fail. The critical loads can be detected very precisely by means of an acoustic sensor attached to the indenter holder, the frictional force and by optical microscopy. Once known the critical loads are used to quantify the adhesive properties of different films/substrate combinations and these parameters constitute a unique signature of the coating system under test.

The pencil hardness test method is a procedure for rapid, inexpensive determination of the film hardness of an organic coating on a substrate by pushing pencil leads of known hardness across a coated test panel. Grading pencils come in an assortment of both hard and soft, ranging in hardness from 9H to 9B. The 'H' stands for hardness, the 'B' stands for blackness, and HB is for hard and black pencils. The hardest pencil is a 9H, followed by 8H, 7H, 6H, 5H, 4H, 3H, 2H, and H. The middle of the hardness scale is F; then HB, B, 2B, 3B, 4B, 5B, 6B, 7B, 8B, and 9B, which is the softest. The hardness of some coatings is such that a 9H pencil will not scratch them; however these coatings still receive a 9H rating to designate their hardness. In the pencil hardness test method a coated test panel is placed on a firm horizontal surface and the pencil, held at a 45° angle, is pushed away from the operator in a ¼ inch (6.5 mm) stroke. The process is started with the hardest pencil and continued down the scale of hardness to either of two end points; one, the pencil that will not cut into or gouge the film (pencil hardness), or two, the pencil that will not scratch the film (scratch hardness). Certain embodiments of compositions described herein yield a coating with up to 4H pencil hardness. Certain embodiments of compositions described herein yield a coating with up to 5H pencil hardness. Certain embodiments of compositions described herein yield a coating with up to 6H pencil hardness. Certain embodiments of compositions described herein yield a coating with up to 7H pencil hardness. Certain embodiments of compositions described herein yield a coating with up to 8H pencil hardness. Certain embodiments of compositions described herein yield a coating with up to 9H pencil hardness.

Slip is determined by measuring the frictional properties of coatings. Friction is the force between surfaces that opposes sliding motion. It is the characteristic that determines the resistance to slip or the magnitude of slip. One method to determine the static friction of a coating is to use an inclined plane sliding test or a horizontal pull test. In the inclined plane test a coated test panel is attached to a flat, movable surface and one or more weighted sleds are individually placed on the coated surface. The movable surface is raised at an incline at $1.5+/-0.5°s^{-1}$ until the sled begins to slide down the inclined coated surface. The tangent of the angle of inclination at this point is reported as the static friction value, with the smaller the angle the greater the slip characteristics of a coating. In the horizontal pull the coated surface remains horizontal and the sled is mechanically pulled across the coated test panel. The force required to start the sled moving is obtained and the static friction is determined by dividing this force by the sled mass. Therefore, coatings with good slip properties have small measured forces.

Other mechanical properties of the coating which may be tested include tensile strength, flexibility, cupping, and elongation at failure.

Flexibility testing methods are used to assess the resistance of a coating to cracking and/or detachment from a flexible substrate when a coated substrate is bent. By way of example only, the test may be used to asses coating on molding. Flexibility is usually measured by a mandrel bend test or a T-bend test which use the bending of metal substrates around a mandrel to evaluate the flexibility of coatings. However, the metal substrate may be replaced by a thermoplastic olefin substrate and the degree of flex prior to failure is noted.

Cupping tests are carried out on coatings applied to flexible substrates. Cupping is potentially a more severe test than the mandrel bend test. In the cupping test, deformation of the panel can be taken to the point where the metal fractures, which does not normally happen during mandrel tests. The method involves sandwiching a coated metal panel is between a hemispherical die and a hemispherical indenter. Pressure is applied to the indenter so as to form a dome shape in the panel with the coating on the convex side. The pressure is increased either to a specified depth or until the coating cracks and/or detaches from the substrate.

Tensile strength, which is the resistance of a material to a force tending to tear it apart and is measured as the maximum tension the material can withstand without tearing. The tensile strength is generally measured on detached coatings, but can be evaluated on coated substrates. A tensile tester usually incorporates a highly sensitive electronic load weighing system with load cells employing strain gauges to detect the load applied to the specimen under test. The test specimen is clamped between two grips one of which is attached to a load cell in a moving crosshead, while the other grip is fixed to the base of the tester. The crosshead is attached to two vertically mounted screws which are rotated using a synchronous motor-gearbox assembly. The load applied to the test specimen and the distance traveled by the crosshead are both displayed on a chart recorder.

Elongation is the deformation that results from the application of a tensile force and is calculated as the change in length divided by the original length. Elongation is a measurement used to determine how far a piece of film will stretch before it breaks. This information is useful in developing a coating to stretch around a corner of a thermoplastic object. The test method involves conditioning a detached test film under specified temperature and humidity conditions, and then cutting the test specimens into known dimensions. A specimen is then clamped between two grips and elongated until it ruptures. The rate of elongation may vary from between 5 and 100 percent per minute.

Testing the effectiveness of a coating to act as a barrier coating with resistance to moisture damage may include complete immersion of the coated substrate into fresh or saline water, followed by periodic observation for blister formation, softening, and wrinkling. The testing method for involves mounting the test panels in a temperature-controlled chamber, and then immersing the coated test panel in an aqueous solution, with or without added salt. Typically, the solution is a 5% salt (sodium chloride) solution, although the methods can vary according to chamber temperature and the composition of the salt solution. Test duration can be from 24 to 480 hours, or longer.

Testing the effectiveness of a coating to act as a sunlight (UV) barrier coating with resistance to discoloration may include exposing a coated substrate to sunlight or UV lights, followed by periodic observation for discoloration and loss of gloss. The testing method involves mounting the test panels at various angles in a temperature-controlled chamber, and then exposing the test panel to sunlight or UV light. Test duration can be from 24 hours to ten weeks, or longer.

Clarity refers to the optical distinctness with which an object can be seen when viewed through a coating film. Clarity depends upon the linearity of the passage of light rays through the material. Small deflections of the light, caused by scattering centers in the coating material, bring about a deterioration of the image. These deflections are much smaller than those registered in haze measurements. While haze measurements depend upon wide angle scattering, clarity is determined by small-angle scattering. Wide and small angle scattering are not directly related to each other and therefore haze measurements cannot provide information about the clarity of the specimen and vice versa. The clarity of a coating may be evaluated using a clarity measuring apparatus, wherein the total light transmittance of an incident light through the coating film is measured over a range of low angles, such as 0.1 to 10 degrees. In certain embodiments the coatings obtained from the coating compositions described herein has a total light transmittance of 70 to 100% at scattering angles of 0.1 to 10 degree. In certain embodiments the coatings obtained from the coating compositions described herein has a total light transmittance of 80 to 100% at scattering angles of 0.1 to 10.degree. In certain embodiments the coatings obtained from the coating compositions described herein has a total light transmittance of 90 to 100%.at scattering angles of 0.1 to 10.degree.

EXAMPLES

Example 1

Formulation for an Abrasion Resistant Clear Coat for Thermoplastic Olefin Objects (which may be Optionally Unprimed) with Improved Adhesion Properties An embodiment for a clear coat composition to yield coatings with excellent adhesion properties is prepared by mixing, with a helical mixer, 20.958% tetrahydrofurfuryl acrylate, 23.953% isobornyl acrylate, 15.070% 1,4-butanediol dimethylacrylate, 18.962% 2-phenoxyethyl acrylate, 16.966% propoxylated glyceryl triacrylate-nano-silica (Nanocryl® C-155, formerly Nanocryl®XP 21 0953, from hanse chemie AG, Geesthacht, Germany), 0.10% acrylated silicone surfactant, (Rad 2100, Tego Division of Degussa Corporation), and 3.992% IRGACURE® (500 (from Ciba Specialty Chemicals 540 White Plains Road, Tarrytown, N.Y., U.S.A.). These components are thoroughly mixed by the helical mixer until a smooth composition is produced. This composition is applied by HVLP and cured by UV light.

Example 2

Formulation for Clear Coat for Thermoplastic Olefin Objects (which may be Optionally Unprimed) with Improved Adhesion Properties An embodiment for a clear coat composition to yield coatings with excellent adhesion properties is prepared by mixing, with a helical mixer, 23.1% tetrahydrofurfuryl acrylate, 26.3% isobornyl acrylate, 16.4% 1,4-butanediol dimethylacrylate, 20.5% 2-phenoxyethyl acrylate, 6.1% propoxylated glyceryl triacrylate and 5% IRGACURE® 500 (from Ciba Specialty Chemicals 540 White Plains Road, Tarrytown, N.Y., U.S.A.). These components are thoroughly mixed by the helical mixer until a smooth composition is produced. This composition is applied by HVLP and cured by UV light.

Example 3

Formulation for Hard, Clear Coat for Thermoplastic Olefin Objects (which may be Optionally Unprimed) with Improved Adhesion Properties An embodiment for a clear coat composition to yield coatings with excellent adhesion properties is prepared by mixing, with a helical mixer, 23.1% tetrahydrofurfuryl acrylate, 26.3% isobornyl acrylate, 16.4% 1,4-butanediol dimethylacrylate, 20.5% 2-phenoxyethyl acrylate, 6.1% propoxylated glyceryl triacrylate, 3% nano-alumina in tripropylene glycol diacrylate (Nanobyk™ 3601 available from Nanophase Technologies Corporation 1319 Marquette Drive, Romeoville, Ill.), and 5% IRGACURE® 500 (from Ciba Specialty Chemicals 540 White Plains Road, Tarrytown, N.Y., U.S.A.). These components are thoroughly mixed by the helical mixer until a smooth composition is produced. This composition is applied by HVLP and cured by UV light.

Example 4

Procedure Used for Making Abrasion Resistant Clear Coat for Thermoplastic Olefin Objects (which may be Optionally Unprimed) with Improved Adhesion Properties A further embodiment is the procedure used for making a clear coat. The components of the coatings composition are mixed under air, as the presence of oxygen prevents premature polymerization. It is desired that exposure light be kept to a minimum, in particularly the use of sodium vapor lights should be avoided. However, the use of darkroom lighting may be an option. The components used in the manufacture of the coating composition which come in contact with monomers and coating mixture, such as mixing vessels and mixing blades, should be made of stainless steel or plastic, preferably polyethylene or polypropylene. Polystyrene and PVC should be avoided, as the monomers and coating mixture will dissolve them. In addition, contact of the monomers and coating mixture with mild steel, alloys of copper, acids, bases, and oxidizers should be avoided. Furthermore, brass fittings must be avoided, as they will cause premature polymerization or gelling. For the manufacture of clear coatings it is only essential to obtain thorough mixing, and consequently the control of shear is not necessary. Adequate mixing of the clear coating composition can be obtained after 1–3 hours using a ⅓ horse power (hp) mixer and a 50 gallon cylindrical tank. Smaller quantities, up to 5 gallons, can be adequately mixed after 3 hours using a laboratory mixer (1/15–1/10hp). Round walled vessels are desired as this avoids accumulation of solids in corners and any subsequent problems associated with incomplete mixing. Another, parameter is that the mixers blades should be placed off of the bottom of the mixing vessel, at a distance of one half of the diameter of the mixer. The monomers are added to the mixing vessel first, followed by the nano-filler and surfactant. Photoinitiators are added last to ensure that the time the complete composition is exposed to light is minimized. With the mixing vessel shielded from light exposure the mixing is then carried out after all the components are added. After mixing, there are air bubbles present and the coating may appear cloudy. These bubbles rapidly dissipate, leaving a clear coating composition. As a final step, prior to removing the coating composition from the mixing vessel, the bottom of the mixing vessel is scraped to see if any un-dissolved solid is present. This is done as a precaution to ensure thorough mixing has taken place. If the composition is thoroughly mixed then the coating composition is filtered through a 1 micron filter using a bag filter. The composition is then ready for use.

Example 5

Manufacture Procedure Used for Making Abrasion Resistant Clear Coat for Thermoplastic Olefin Objects (which may be Optionally Unprimed) with Improved Adhesion Properties A further embodiment is the manufacture procedure for pigmented coatings. Here a mixer of sufficient power and configuration is used to create laminar flow and efficiently bring the pigment dispersions against the blades of the mixer. For small laboratory quantities below 400 mLs, a laboratory mixer or blender is sufficient, however for quantities of up to half of a gallon a 1/15–1/10 hp laboratory mixer can be used, but mixing will take several days. For commercial quantities, a helical or saw-tooth mixer of at least 30 hp with a 250 gallon round walled, conical bottomed tank may be used. To make a pigmented composition a clear coating composition is mixed first, see Example 1. The pigment dispersion mixtures are premixed prior to addition to the clear coat composition as this ensures obtaining the correct color. The premixing of the pigments dispersions is easily achieved by shaking the pigments dispersion in a closed container, while wearing a dust mask. The premixed pigments/pigment dispersions, and solid photoinitiator are then added to the clear coat composition and mixed for 1½ to 2 hours. Completeness of mixing is determined by performing a drawdown and checking for un-dissolved pigment. This is accomplished by drawing off a small quantity of the pigmented mixture from the bottom of the mixing tank and applying a thin coating onto a surface. This thin coating is then examined for the presence of any pigment which had not dissolved. The mixture is then run through a 100 mesh filter. A thoroughly mixed pigmented coating composition will show little or no un-dissolved pigment.

Example 6

Process for Coating the Motor-Vehicle TPO Bumpers (which may be Optionally Unprimed) with Abrasion Resistant Clear Coat with Improved Adhesion Properties Still another embodiment is the process for coating the external surface of TPO bumpers with an actinic radiation curable composition as described in example 1. The process begins by attaching a TPO bumper to rotation system to allow rotation of the shaft around the axis running along the rod length, and then attaching this combination to a conveyer belt system. The TPO bumper may be pre-cleaned using a biodegradable organic cleaner at a separate Cleaning Station or the TPO bumper may be pre-cleaned prior to attachment onto the rotation system. Note that rotation of the TPO bumper assembly during the coating procedure ensures a complete coating of the TPO bumper surface. The rotatable TPO bumper assembly is then moved via the conveyer belt system into the coating application section, locating the rotatable TPO bumper assembly in the vicinity of electrostatic spraying system. The electrostatic spraying system has three spray heads arranged to ensure top, bottom and side coverage of the object being coated. Rotation of the TPO bumper assembly begins prior to spraying of the coating composition (described in Example 1) from the three spray heads. The coating composition is then applied simultaneously from the three electrostatic spray heads, while the TPO bumper assembly continues to rotate. The coated TPO bumper assembly is then transported by the conveyer belt into a curing chamber located further down the process line. The curing chamber has two sets of doors which are closed during curing to protect operators form exposure to UV radiation. Inside the curing chamber the three sets of UV lamps are arranged to ensure top, bottom and side exposure to the UV radiation. Furthermore each UV lamp set contains two separate lamp types; one a mercury arc lamp and the other a mercury arc lamp doped with iron, to ensure proper curing. Therefore there are actually six lamps with in the curing chamber. Note that this three dimensional curing can be achieved by using only two lamps, one a mercury arc lamp and the other a mercury arc lamp doped with iron, with a mirror assembly to ensure exposure to the top, bottom and sides. Once inside the curing chamber the doors close and the TPO bumper assembly is again rotated. The mercury arc lamp doped with iron is then activated for the partial curing stage, and then the mercury arc lamp is activated for full cure. Note that the mercury arc lamp doped with iron does not need to be completely off before the mercury arc lamp is turned on, and the time of exposure to the doped mercury arc lamp is less than the time of exposure to the pure mercury arc lamp. Both lamps are turned off and rotation of the TPO bumper assembly is stopped. The doors on the other side of the curing chamber are opened and the fully cured TPO bumper with a clear, abrasion resistant coating with excellent adhesion properties is then moved via the conveyer belt to a packaging area away from the curing chamber. The TPO bumper is then removed from the rotation system, packed and shipped.

Example 7

Adhesion Testing of Abrasion Resistant Clear Coat with Improved Adhesion Properties A further embodiment is testing the adhesion of the coating obtained from the UV-curable coating composition described in Example 1. The adhesion stability of the cured composition coated onto a TPO bumper, as described in Example 6, was conducted using a cross-hatched adhesion test. The cross hatch tape test uses a cross-hatch pattern obtained from a special cross-hatch cutter with multiple preset blades to ensure the incisions are properly spaced and parallel. The cuts are made through the coating down to the underlying surface. Pressure sensitive tape is applied and removed over the cuts made in the coating, and the tape is then pulled off, the cut area and inspected for any removed coating. The coating obtained from the composition described in example 1 shows 99+% adhesion.

All percentages given are by weight. Cited solid pigment dispersions are available from Elementis, Staines, UK. IRGACURE® (is available® from Ciba Specialty Chemicals 540 White Plains Road, Tarrytown, N.Y., U.S.A. ESACURE® KTO's are available from Lamberti S.p.A., Gallarate (VA), Italy. Lucirin®TPO is available from BASF Corporation, New Jersey, USA. Nano-alumina in tripropylene glycol diacrylate; Nanobyk™ 3601 is available from Nanophase Technologies Corporation 1319 Marquette Drive, Romeoville, Ill. Nanocryl® C-155, formerly Nanocryl®XP 21 0953, is available from hanse chemie AG, Geesthacht, Germany, and Rad 2100, is available from Tego Division of Degussa Corporation.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An actinic radiation curable composition having a viscosity between 2–500 cps comprising a mixture of at least one monomer selected from the group consisting of a tetrahydrofurfuryl acrylate, an isobornyl acrylate, a 1,4-butanediol dimethylacrylate, a 2-phenoxyethyl acrylate, a propoxylated glyceryl triacrylate, a trimethylolpropane triacrylate, and a tripropylene glycol diacrylate; at least one free radical photoinitiator; and at least one inorganic nano-filler present in the mixture up to about 17% of the composition by weight; wherein the composition when cured as a coating on a thermoplastic olefin material is an abrasion and scratch resistant coating having at least one property selected from the group consisting of (a) at least 4H hardness; (b) 99+% adhesion; and (c) total light transmittance of 80 to 100% at scattering angles of 0.1 to 10°, wherein the thermoplastic olefin material has not been primed prior to coating with the composition.

2. The composition of claim 1, wherein the composition when cured as a coating on a thermoplastic olefin material is an abrasion and scratch resistant coating having at least two properties selected from the group consisting of (a) at least 4H hardness; (b) 99+% adhesion; and (c) total light transmittance of 80 to 100% at scattering angles of 0.1 to 10°.

3. The composition of claim 1, wherein the composition when cured as a coating on a thermoplastic olefin material is an abrasion and scratch resistant coating having (a) at least 4H hardness; (b) 99+% adhesion; and (c) total light transmittance of 80 to 100% at scattering angles of 0.1 to 10°.

4. The actinic radiation curable composition of claim 1, wherein the at least one monomer is present in the mixture between about 75–98% of the composition by weight.

5. The actinic radiation curable composition of claim 1, wherein the at least one free radical photoinitiator is present in the mixture between about 2–10% of the composition by weight.

6. The actinic radiation curable composition of claim 1, wherein the composition comprises at least one surfactant present in the mixture up to about 2% of the composition by weight.

7. The actinic radiation curable composition of claim 1, wherein the mixture comprises 75–98% of the composition by weight of the at least one monomer, and 2–10% of the composition by weight of the at least one free radical photoinitiator.

8. The actinic radiation curable high solids content coating composition of claim 1, wherein the mixture comprises 75–98% of the composition by weight of the at least one monomer, 2–10% of the composition by weight of the at least one free radical photoinitiator, and at least one surfactant in an amount of up to about 2% of the composition by weight; whereby the room temperature viscosity of the composition is about 30 centipoise.

9. The actinic radiation curable composition of claim 1, wherein at least one monomer swells the thermoplastic olefin material whereby improving adhesion of the cured coating.

10. The actinic radiation curable composition of claim 1, wherein the at least one free radical photoinitiator is selected from a group consisting of diphenyl (2,4,6-trimethylbenzoyl) phosphine oxide, dimethyl ketal, benzophenone, 1-hydroxycyclohexyl phenyl ketone, 2-hydroxy-2-methyl-1-phenyl-propan-1-one, 2,4,6,-trimethylbenzophenone, 4-methylbenzophenone, oligo (2-hydroxy-2-methyl-1-(4-(1-methylvinyl)phenyl)propanone), and combinations thereof.

11. The actinic radiation curable composition of claim 1, wherein at least one inorganic nano-filler comprises particles and is selected from a group consisting of nano-aluminum oxide, nano-silicon dioxide, nano-zirconium oxide, nano-zirconium dioxides, nano-silicon carbide, nano-silicon nitride, silicon aluminum oxynitride, nano-aluminum nitride, nano-bismuth oxide, nano-cerium oxide, nano-copper oxide, nano-iron oxide, nano-nickel titanate, nano-niobium oxide, nano-rare earth oxide, nano-silver oxide, nano-tin oxide, and nano-titanium oxide, and combinations thereof.

12. The actinic radiation curable composition of claim 1, wherein the composition coats at least a portion of a surface of a thermoplastic olefin object and the coating is uncured.

13. The surface of claim 12, wherein the coating has been applied to the thermoplastic olefin object surface by an electrostatic spraying apparatus.

14. The surface of claim 12, wherein the coating is applied in a single application.

15. The actinic radiation curable composition of claim 1, wherein the composition is curable with actinic radiation selected from the group consisting of visible radiation, near visible radiation, ultra-violet (UV) radiation, and combinations thereof.

16. A method for producing the actinic radiation curable composition of claim 1, comprising adding components to a container, and using a means for mixing the components together.

* * * * *